(12) United States Patent
Kong et al.

(10) Patent No.: US 11,745,472 B2
(45) Date of Patent: Sep. 5, 2023

(54) METHODS AND APPARATUS FOR GLASS LAMINATE EDGE FINISHING AND GLASS LAMINATES FORMED THEREBY

(71) Applicant: Corning Incorporated, Corning, NY (US)

(72) Inventors: Sun-Hwan Kong, Hwaseong-si (KR); Cheol Hee Park, Cheonan-si (KR); Dong Keun Shin, Gyeonggi-do (KR)

(73) Assignee: CORNING INCORPORATED, Corning, NY (US)

( * ) Notice: Subject to any disclaimer, the term of this patent is extended or adjusted under 35 U.S.C. 154(b) by 221 days.

(21) Appl. No.: 16/341,778

(22) PCT Filed: Oct. 12, 2017

(86) PCT No.: PCT/KR2017/011271
§ 371 (c)(1),
(2) Date: Apr. 12, 2019

(87) PCT Pub. No.: WO2018/070814
PCT Pub. Date: Apr. 19, 2018

(65) Prior Publication Data
US 2020/0276683 A1 Sep. 3, 2020

(30) Foreign Application Priority Data

Oct. 12, 2016 (KR) .................. 10-2016-0132404

(51) Int. Cl.
*B24B 9/08* (2006.01)
*B24B 41/06* (2012.01)
(Continued)

(52) U.S. Cl.
CPC .......... *B32B 17/10018* (2013.01); *B24B 7/24* (2013.01); *B24B 9/08* (2013.01);
(Continued)

(58) Field of Classification Search
CPC .... B24B 9/08; B24B 9/10; B24B 7/24; B24B 7/242; B24B 7/247; B24B 41/06; B24B 41/068; B24B 47/10
(Continued)

(56) References Cited

U.S. PATENT DOCUMENTS

| | | | | |
|---|---|---|---|---|
| 1,848,470 A | * | 3/1932 | Fohrenbach | B24B 9/102 |
| | | | | 451/260 |
| 1,850,432 A | * | 3/1932 | Weber | B24B 9/102 |
| | | | | 409/138 |

(Continued)

FOREIGN PATENT DOCUMENTS

| | | |
|---|---|---|
| JP | 866863 A | 3/1996 |
| JP | 2000327376 A | 11/2000 |

(Continued)

OTHER PUBLICATIONS

European Patent Application No. 17859746.4, Office Action dated Apr. 23, 2021; 5 pages; European Patent Office.

(Continued)

*Primary Examiner* — Joel D Crandall
*Assistant Examiner* — Makena S Markman

(57) ABSTRACT

An apparatus for finishing a cut edge of a glass laminate includes a support including a surface and an edge, a rail disposed adjacent the support and extending substantially parallel to the edge, a carrier coupled to the rail, and a finishing tool coupled to the carrier and including an abrasive surface positioned adjacent the edge. The carrier is translatable along the rail to translate the abrasive surface relative to the edge. A method includes securing a glass laminate to a support and contacting a cut edge of the glass laminate with an abrasive surface of a finishing tool coupled to a carrier. The carrier is translated along a rail to move the abrasive surface along the cut edge of the glass laminate and transform the cut edge into a finished edge. The glass (Continued)

laminate can have an edge strength of at least about 100 MPa.

10 Claims, 18 Drawing Sheets

(51) Int. Cl.
B24B 47/10 (2006.01)
B24B 7/24 (2006.01)
B24B 9/10 (2006.01)
B32B 17/10 (2006.01)
B32B 38/00 (2006.01)

(52) U.S. Cl.
CPC .............. *B24B 9/10* (2013.01); *B24B 41/06* (2013.01); *B24B 41/068* (2013.01); *B24B 47/10* (2013.01); *B32B 17/10* (2013.01); *B32B 17/10036* (2013.01); *B32B 17/1099* (2013.01); *B32B 17/10743* (2013.01); *B32B 17/10761* (2013.01); *B32B 38/0012* (2013.01); *B32B 2038/0016* (2013.01)

(58) Field of Classification Search
USPC ....................................................... 451/44, 5
See application file for complete search history.

(56) References Cited

U.S. PATENT DOCUMENTS

| | | | |
|---|---|---|---|
| 1,910,748 A | 5/1933 | Burk | |
| 2,022,530 A | 11/1935 | White | |
| 3,187,467 A * | 6/1965 | Cortesi | B24B 9/10 451/151 |
| 3,338,696 A | 8/1967 | Dockerty | |
| 3,682,609 A | 8/1972 | Dockerty | |
| 3,805,455 A * | 4/1974 | Aellig | B24B 9/102 451/190 |
| 4,375,738 A * | 3/1983 | Bando | B24B 9/10 451/270 |
| 4,989,373 A * | 2/1991 | Park | B24B 9/107 451/285 |
| 5,074,079 A * | 12/1991 | Park | B24B 9/107 451/11 |
| 5,433,652 A * | 7/1995 | Park | B24B 9/107 451/10 |
| 6,099,385 A | 8/2000 | Stock et al. | |
| 6,712,061 B1 * | 3/2004 | Kalb | B23D 45/024 125/10 |
| 7,001,249 B1 * | 2/2006 | Pride | B24B 9/102 451/190 |
| 8,079,895 B2 * | 12/2011 | Bando | B24B 41/005 451/255 |
| 8,353,278 B2 * | 1/2013 | Plaskett | B28D 1/048 125/13.02 |
| 8,540,551 B2 | 9/2013 | Brown et al. | |
| 9,028,296 B2 * | 5/2015 | Venkatachalam | B24B 7/242 451/44 |
| 10,029,941 B2 | 7/2018 | Forenz et al. | |
| 10,131,118 B2 | 11/2018 | Kang et al. | |
| 10,384,324 B2 | 8/2019 | Shafrir | |
| 2006/0283537 A1 | 12/2006 | Lisec | |
| 2011/0081542 A1 | 4/2011 | Pilloy et al. | |
| 2011/0318994 A1 | 12/2011 | Darcangelo et al. | |
| 2012/0034435 A1 | 2/2012 | Borrelli et al. | |
| 2012/0202030 A1 * | 8/2012 | Kondo | B32B 17/06 428/215 |
| 2015/0190898 A1 | 7/2015 | Darcangelo et al. | |
| 2017/0165871 A1 | 6/2017 | Forenz et al. | |
| 2018/0154493 A1 | 6/2018 | Forenz et al. | |

FOREIGN PATENT DOCUMENTS

| | | |
|---|---|---|
| KR | 2012038947 A | 4/2012 |
| WO | 2014/107640 A1 | 7/2014 |
| WO | 2015/120109 A1 | 8/2015 |
| WO | 2015/153251 A1 | 10/2015 |
| WO | 2016/126657 A1 | 8/2016 |
| WO | 2018/070814 A2 | 4/2018 |

OTHER PUBLICATIONS

European Patent Application No. 17859746.4 Office Action dated Jun. 8, 2020; 8 Pages; European Patent Office.
English Translation of KR10-20160132404 Office Action dated Jun. 29, 2020; 5 Pages; Korean Patent Office.
Chinese Patent Application No. 201780070095.6; Office Action dated Nov. 24, 2020; 13 Pages; Chinese Patent Office.
Chinese Patent Application No. 201780070095.6, Office Action dated Oct. 18, 2021, 9 pages English Translation; Chinese Patent Office.

* cited by examiner

ME THODS AND APPARATUS FOR GLASS LAMINATE EDGE FINISHING AND GLASS LAMINATES FORMED THEREBY

BACKGROUND

This application is a national phase application under 35 U.S.C. § 371 of PCT/KR2017/011271 filed on Oct. 12, 2017, which claims the benefit of priority to Korean Patent Application No.: 10-2016-0132404 filed Oct. 12, 2016, the content of both of which is incorporated herein by reference in their entirety.

1. FIELD

This disclosure relates to glass laminates and, more particularly, methods and apparatus for glass laminate edge finishing.

2. TECHNICAL BACKGROUND

Glass laminates may be used as components in the fabrication of various appliances, automobile components, architectural structures, and electronic devices. For example, glass laminates may be incorporated as covering materials for various products such as walls, cabinets, backsplashes, appliances, or televisions. However, it may be difficult to cut and/or finish glass laminates without causing fractures in the glass layer and while maintaining sufficient edge strength to enable use of the glass laminates without causing fractures in the glass layer.

SUMMARY

Disclosed herein are methods and apparatus for glass laminate edge finishing and glass laminates formed thereby.

Disclosed herein is an apparatus for finishing a cut edge of a glass laminate. The apparatus comprises a support, a rail, a carrier, and a finishing tool. The support comprises a surface and an edge. The rail is disposed adjacent to the support and extends substantially parallel to the edge of the support. The carrier is coupled to the rail. The finishing tool is coupled to the carrier and comprises an abrasive surface positioned adjacent to the edge of the support. The carrier is translatable along the rail to translate the abrasive surface of the finishing tool relative to the edge of the support.

Also disclosed herein is a method comprising securing a glass laminate to a surface of a support. The glass laminate comprises a glass sheet laminated to a non-glass substrate. A cut edge of the glass laminate is contacted with an abrasive surface of a finishing tool coupled to a carrier. The abrasive surface is oriented to apply a force to the glass sheet in a direction toward the non-glass substrate during the contacting. The carrier is translated along a rail extending substantially parallel to an edge of the support to move the abrasive surface along the cut edge of the glass laminate and transform the cut edge into a finished edge.

Also disclosed herein is a glass laminate comprising a flexible glass sheet laminated to a non-glass substrate and an edge strength of at least about 100 MPa.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
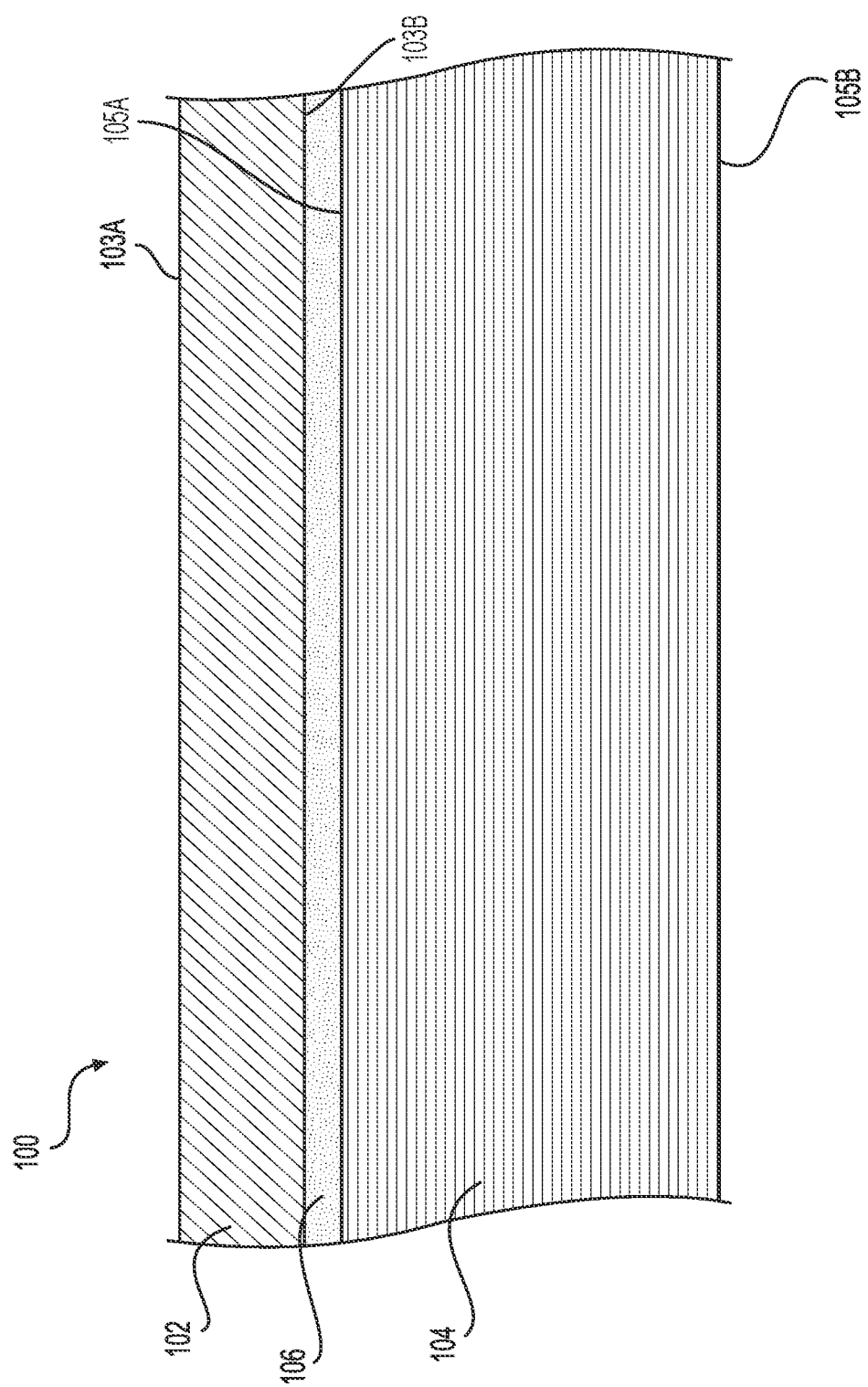
FIG. 1 is a schematic cross-sectional view of exemplary embodiments of a glass laminate 100.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, an apparatus for finishing a cut edge of a glass laminate comprises a support, a rail, a carrier, and a finishing tool. The support comprises a surface and an edge. The rail is disposed adjacent to the support and extends substantially parallel to the edge of the support. The carrier is coupled to the rail. The finishing tool is coupled to the carrier and comprises an abrasive surface positioned adjacent to the edge of the support. The carrier is translatable along the rail to translate the abrasive surface of the finishing tool relative to the edge of the support. Surprisingly, finishing the edge of a glass laminate using the apparatus described herein can enable a finished glass laminate with improved edge strength, even compared to an alternative finishing process using the same finishing tool.

In various embodiments, a method comprises securing a glass laminate comprising a glass sheet laminated to a non-glass substrate to a surface of a support. A cut edge of the glass laminate is contacted with an abrasive surface of a finishing tool coupled to a carrier. The abrasive surface is oriented to apply a force to the glass sheet in a direction toward the non-glass substrate during the contacting. The carrier is translated along a rail extending substantially parallel to an edge of the support to move the abrasive surface along the cut edge of the glass laminate and transform the cut edge into a finished edge.

Surprisingly, finishing the edge of a glass laminate using the apparatus and methods described herein can enable a finished glass laminate with improved edge strength, even compared to an alternative finishing process using the same finishing tool. For example, in various embodiments, a glass laminate comprises a flexible glass sheet laminated to a non-glass substrate and an edge strength of at least about 100 MPa. Additionally, or alternatively, the glass laminate demonstrates an increase in edge strength of at least about 100% compared to an unfinished glass laminate having the same configuration.

FIG. 1 is a schematic cross-sectional view of exemplary embodiments of a glass laminate 100. Glass laminate 100 comprises a glass sheet 102 laminated to a non-glass substrate 104. Glass sheet 102 comprises a first surface 103A and a second surface 103B opposite the first surface. Non-glass substrate 104 comprises a first surface 105A and a second surface 105B opposite the first surface. In some embodiments, glass sheet 102 is laminated to first surface 105A of non-glass substrate 104. For example, second surface 103B of glass sheet 102 is disposed adjacent (e.g., directly adjacent or with an intervening adhesive material) first surface 105A of non-glass substrate 104. In some embodiments, glass sheet 102 is laminated to non-glass substrate 104 with an adhesive 106 as shown in FIG. 1. Thus, glass sheet 102 is bonded to non-glass substrate 104 with adhesive 106. In other embodiments, the adhesive is omitted such that the glass sheet is laminated directly to the non-glass substrate. For example, the glass sheet can be laminated directly to a non-glass substrate comprising a polymer, binder, or resin as described herein. Thus, the glass sheet is bonded to the non-glass substrate with the polymer, binder, or resin of the non-glass substrate.

In various embodiments, glass sheet 102 is formed from or comprises a glass material, a ceramic material, a glass-ceramic material, or a combination thereof. For example, glass sheet 102 is a flexible glass sheet commercially available under the trade name Corning® Willow® Glass (Corning Incorporated, Corning, N.Y., USA) or a chemically strengthened glass sheet commercially available under the trade name Corning® Gorilla® Glass (Corning Incorporated, Corning, N.Y., USA). Glass sheet 102 can be formed using a suitable forming process such as, for example, a downdraw process (e.g., a fusion draw process or a slot draw process), a float process, an updraw process, or a rolling process. Glass sheets produced using a fusion draw process generally have surfaces with superior flatness and smoothness when compared to glass sheets produced by other methods. The fusion draw process is described in U.S. Pat. Nos. 3,338,696 and 3,682,609, each of which is incorporated by reference herein in its entirety.

In some embodiments, glass sheet 102 comprises anti-microbial properties. For example, glass sheet 102 comprises a sufficient silver ion concentration at the surface of the glass sheet to exhibit anti-microbial properties (e.g., in the range from greater than 0 to 0.047 $\mu g/cm^2$) as described in U.S. Patent Application Publication No. 2012/0034435, which is incorporated by reference herein in its entirety. Additionally, or alternatively, glass sheet 102 is coated with a glaze comprising silver, or otherwise doped with silver ions, to exhibit anti-microbial properties as described in U.S. Patent Application Publication No. 2011/0081542, which is incorporated by reference herein in its entirety. In some embodiments, glass sheet 102 comprises about 50 mol % $SiO_2$, about 25 mol % CaO, and about 25 mol % $Na_2O$ to exhibit anti-microbial properties.

In some embodiments, a thickness of glass sheet 102 (e.g., a distance between first surface 103A and second surface 103B) is at least about 0.01 mm, at least about 0.02 mm, at least about 0.03 mm, at least about 0.04 mm, at least about 0.05 mm, at least about 0.06 mm, at least about 0.07 mm, at least about 0.08 mm, at least about 0.09 mm, at least about 0.1 mm, at least about 0.2 mm, at least about 0.3 mm, at least about 0.4 mm, or at least about 0.5 mm. Additionally, or alternatively, a thickness of glass sheet 102 is at most about 3 mm, at most about 2 mm, at most about 1 mm, at most about 0.7 mm, at most about 0.5 mm, at most about 0.3 mm, at most about 0.2 mm, or at most about 0.1 mm. In some embodiments, glass sheet 102 is a flexible glass sheet. For example, the thickness of glass sheet 102 is at most about 0.3 mm. Additionally, or alternatively, glass sheet 102 is a strengthened glass sheet (e.g., a thermally tempered or chemically strengthened glass sheet). For example, the thickness of glass sheet 102 is about 0.4 mm to about 3 mm.

In various embodiments, non-glass substrate 104 is formed from or comprises primarily non-glass materials. For example, non-glass substrate 104 comprises wood-based materials (e.g., wood, chipboard, particleboard, fiberboard, hardboard, cardboard, and/or paper), polymeric materials, and/or metal materials. In some embodiments, non-glass substrate 104 comprises glass, glass-ceramic, and/or ceramic materials as secondary constituents (e.g., fillers). However, in such embodiments, non-glass substrate 104 is free of glass, glass-ceramic, or ceramic sheets (e.g., solid or substantially solid sheets as opposed to fibrous mats or weaves).

Figure 2:
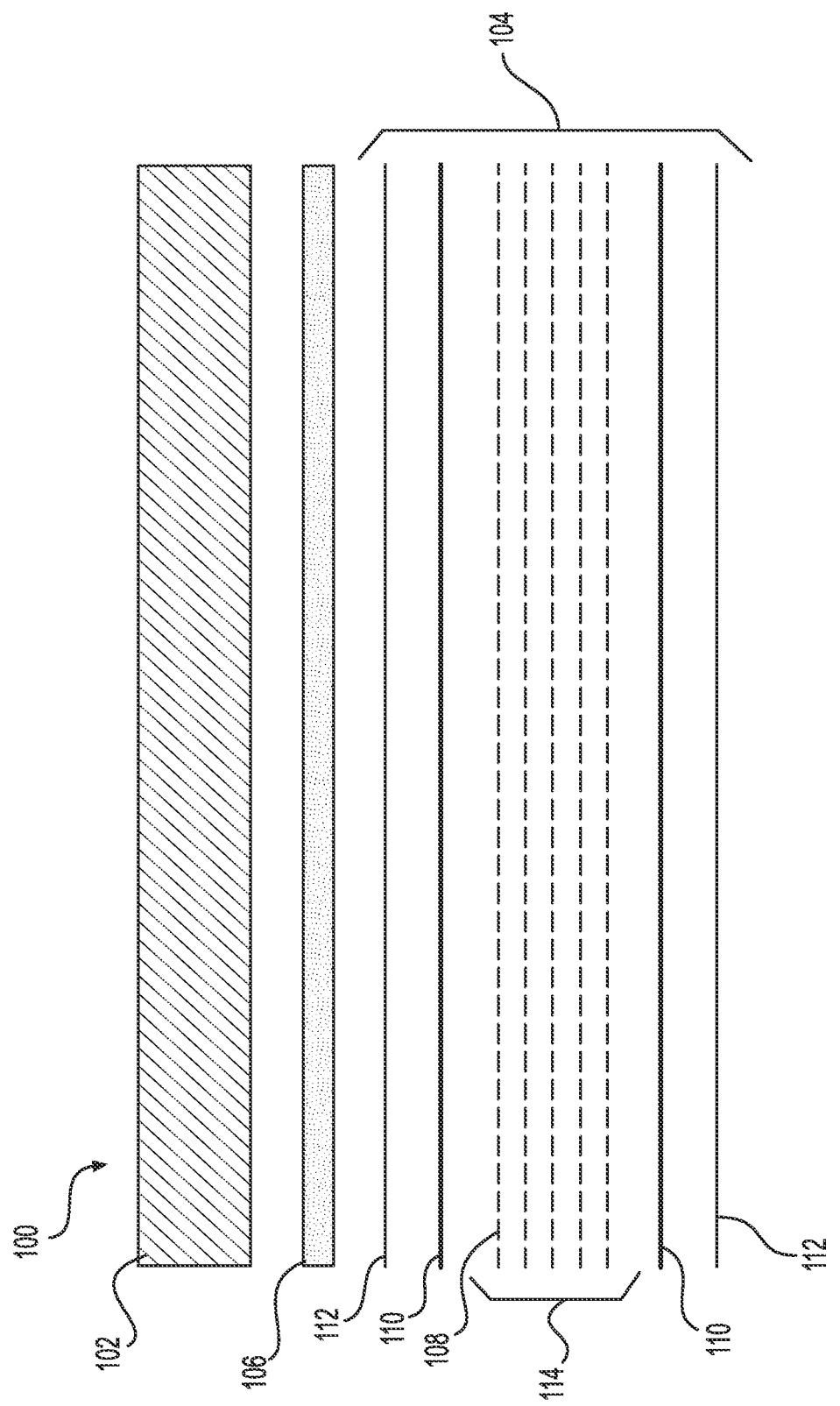
FIG. 2 is an exploded schematic cross-sectional view of exemplary embodiments of the glass laminate of FIG. 1 in which the non-glass substrate comprises a plurality of polymer impregnated papers.

In some embodiments, non-glass substrate 104 is formed from or comprises one or more layers of polymer-impregnated paper. For example, FIG. 2 is an exploded schematic cross-sectional view of exemplary embodiments of glass laminate 100 in which non-glass substrate 104 comprises a plurality of polymer impregnated papers. In some embodiments, the plurality of polymer impregnated papers is a high pressure laminate (HPL) material, a low pressure laminate (LPL) material, or a continuous pressure laminate (CPL) material. For example, the plurality of polymer impregnated papers comprises one or more core papers 108, one or more decorative papers 110, and/or one or more surface papers 112. In some embodiments, core papers 108 are kraft papers impregnated with a phenolic resin. Core papers 108 form a core 114 of non-glass substrate 104, which can comprise a majority of a thickness of the non-glass substrate as shown in FIG. 2. Additionally, or alternatively, a decorative paper 110 is disposed on an outer surface of core 114 of non-glass substrate 104. In some embodiments, decorative paper 110 comprises a pair of decorative papers, and one of the pair of decorative papers is disposed on each of opposing outer surfaces of core 114 as shown in FIG. 2. In some embodiments, decorative papers 110 comprise a decoration that is visible through glass sheet 102 or at a non-glass surface of glass laminate 100 opposite the glass sheet. For example, the decoration comprises a solid color, a decorative pattern, or an image (e.g., printed on outer surfaces of the decorative papers). In some embodiments, decorative papers 110 are kraft papers impregnated with a phenolic resin and/or a melamine resin. Additionally, or alternatively, a surface paper 112 is disposed on an outer surface of decorative paper 110. In some embodiments, surface paper 112 comprises a pair of surface papers, and one of the pair of surface papers is disposed on an outer surface of each of the pair of decorative papers as shown in FIG. 2. Thus, each of the pair of decorative papers 110 is disposed between the respective surface paper 112 and core 114. In some embodiments, surface papers 112 are tissue or kraft papers impregnated with a melamine resin. Surface papers 112 can be sufficiently thin that the underlying decorative papers 110 are visible through the surface papers, but sufficiently resilient to protect the underlying decorative papers. The plurality of polymer impregnated papers can be pressed at elevated temperature and pressure to cure the polymer and form the non-glass substrate.

Surface papers 112 impregnated with melamine resin can provide a damage-resistant surface that can help to protect the underlying decorative papers 110. Thus, in embodiments in which the decorative paper is impregnated with a melamine resin, the respective surface layer can be omitted. Additionally, or alternatively, the surface layer that would otherwise be disposed between the glass sheet and the core of the non-glass substrate can be omitted because the glass sheet can serve as the protective layer for the underlying decorative paper. Thus, in some embodiments, the glass laminate comprises a surface layer disposed at the non-glass surface of the non-glass substrate remote from the glass sheet and is free of a surface layer disposed at the glass surface of the non-glass substrate closest to the glass sheet.

In some embodiments, the non-glass substrate comprises a functional layer in addition to the polymer impregnated papers. For example, the functional layer comprises one or more moisture barrier layers embedded within the polymer impregnated papers to prevent moisture from penetrating into the non-glass substrate. The moisture barrier layers can be formed from or comprise a metal, a polymer, or combinations thereof.

In some embodiments, a thickness of non-glass substrate 104 (e.g., a distance between first surface 105A and second surface 105B) is at least about 1 mm, at least about 2 mm, at least about 3 mm, at least about 4 mm, at least about 5 mm, at least about 6 mm, at least about 7 mm, at least about 8 mm, at least about 9 mm, or at least about 10 mm. Additionally, or alternatively, the thickness of non-glass substrate 104 is at most about 100 mm, at most about 90 mm, at most about 80 mm, at most about 70 mm, at most about 60 mm, at most about 50 mm, at most about 40 mm, at most about 30 mm, at most about 29 mm, at most about 28 mm, at most about 27 mm, at most about 26 mm, at most about 25 mm, at most about 24 mm, at most about 23 mm, at most about 22 mm, at most about 21 mm, or at most about 20 mm.

Although non-glass substrate 104 described with reference to FIG. 2 comprises a plurality of polymer impregnated papers, other embodiments are included in this disclosure.

For example, in other embodiments, the non-glass substrate is formed from or comprises a wood-based material comprising wood fragments dispersed in a binder. In some of such embodiments, the wood fragments comprise wood particles, wood chips, and/or wood fibers. Additionally, or alternatively, the binder comprises a resin that binds the wood fragments. For example, in some embodiments, the resin comprises a urea-formaldehyde (UF) resin, a phenol formaldehyde (PF) resin, a melamine-formaldehyde (MF) resin, a methylene diphenyl diisocyanate (MDI) resin, a polyurethane (PU) resin, a compatible mixture thereof, or a compatible combination thereof. In some embodiments, the non-glass substrate is a chipboard material, a fiberboard material (e.g., particleboard, medium density fiberboard (MDF), or hardboard), or a plywood material. For example, the non-glass substrate is a wood-based panel such as a chipboard panel, a fiberboard panel (e.g., a particleboard panel, a MDF panel, or a hardboard panel), or a plywood panel. The wood fragments and binder can be pressed at elevated temperature and pressure to cure the binder and form the non-glass substrate.

Also for example, in other embodiments, the non-glass substrate is formed from or comprises a polymeric material. In some of such embodiments, the polymeric material comprises polyethylene terephthalate (PET), polyethylene naphthalate (PEN), ethylene tetrafluoroethylene (ETFE), thermopolymer polyolefin (TPO™—polymer/filler blends of polyethylene, polypropylene, block copolymer polypropylene (BCPP), or rubber), polyester, polycarbonate, polyvinylbuterate, polyvinyl chloride (PVC), polyethylene or substituted polythyelene, polyhydroxybutyrate, polyhydroxyvinylbutyrate, polyvinylacetylene, transparent thermoplastic, transparent polybutadiene, polycyanoacrylate, cellulose-based polymer, polyacrylate, polymethacrylate, polyvinylalcohol (PVA), polysulphide, polyvinyl butyral (PVB), poly(methyl methacrylate) (PMMA), polysiloxane, or combinations thereof.

In some embodiments, the non-glass substrate comprises a decoration that is visible through the glass sheet or at a non-glass surface of the glass laminate opposite the glass sheet. For example the decoration comprises a decorative layer (e.g., a decorative paper or polymer), ink or paint, or a veneer disposed at an outer surface of the non-glass substrate. Additionally, or alternatively, the non-glass substrate comprises a combination of materials described herein (e.g., polymer impregnated papers, wood-based material, and/or polymeric material).

In various embodiments, adhesive 106 is formed from or comprises a polymeric material. In some embodiments, the polymeric material is selected from the group consisting of a silicone, an acrylate (e.g., polymethyl methacrylate (PMMA)), a polyurethane polyvinylbutyrate, an ethylenevinylacetate, an ionomer, a polyvinyl butyral, compatible mixtures thereof, and compatible combinations thereof. For example, adhesive 106 comprises DuPont SentryGlas®, DuPont PV 5411, Japan World Corporation material FAS, or polyvinyl butyral resin. In some embodiments, adhesive 106 comprises a thermoplastic polymer material. Additionally, or alternatively, adhesive 106 is a sheet or film of adhesive. In some of such embodiments, adhesive 106 comprises a decorative pattern or design visible through glass sheet 102. In some embodiments, adhesive 106 comprises a functional component that exhibits, for example, color, decoration, heat or UV resistance, IR filtration, or combinations thereof. Additionally, or alternatively, adhesive 106 is optically clear on cure, translucent, or opaque.

In some embodiments, a thickness of adhesive 106 (e.g., a distance between second surface 103B of glass sheet 102 and first surface 105A of non-glass substrate 104) is at most about 5000 µm, at most about 1000 µm, at most about 500 µm, at most about 250 µm, at most about 50 µm, at most about 40 µm, at most about 30 µm, or at most about 25 µm. Additionally, or alternatively, the thickness of adhesive 106 is at least about 5 µm, at least about 10 µm, at least about 15 µm, at least about 20 µm, at least about 50 µm, or at least about 100 µm.

In some embodiments, glass laminate 100 comprises a single glass sheet 102. For example, glass laminate 100 is free of a glass sheet laminated to second surface 105B of non-glass substrate. In some of such embodiments, second surface 1058 of non-glass substrate 104 is an exterior surface of glass laminate 100.

Although glass laminate 100 shown in FIGS. 1-2 comprises a single glass sheet 102 laminated to first surface 105A of non-glass substrate 104, other embodiments are included in this disclosure. For example, in other embodiments, a glass laminate comprises a second glass sheet laminated to the second surface of the non-glass substrate (e.g., opposite first surface 105A of non-glass substrate 104). Thus, the non-glass substrate is disposed between the glass sheet and the second glass sheet. Each glass sheet can be laminated to the non-glass substrate as described herein with reference to glass sheet 102 and non-glass substrate 104.

The glass laminate may not have a desired size and/or shape as formed. Thus, in various embodiments, the glass laminate may be cut to a determined size or shape. In such embodiments, the glass laminate may be referred to as a preform glass laminate, which may be cut to form one or more glass laminates of different sizes and/or shapes. In some embodiments, the preform glass laminate is cut using a mechanical cutting process. For example, the preform glass laminate may be cut using a mechanical cutting tool such as a router, a saw, or another cutting tool. In other embodiments, the preform glass laminate is cut using a fluid jet, a laser, or another cutting device. In some embodiments, the cutting tool is mounted on a computer numerical control (CNC) machine that controls movement of the tool relative to the preform glass laminate. In other embodiments, the cutting tool is a handheld tool.

After cutting the preform glass laminate, the resulting glass laminate comprises one or more cut edges. For example, the one or more cut edges are edges that are formed during the cutting process (e.g., interior regions of the glass laminate preform that become exterior edges of the glass laminate after cutting). The glass laminate comprising the one or more cut edges can be referred to as an unfinished glass laminate. The glass sheet can have small cracks, chips, or other defects along such cut edges. For example, small cracks or chips can be formed in the glass sheet during a mechanical cutting process. Such cracks or other defects can reduce the strength of the glass sheet. If the strength of the glass sheet is not maintained at a suitable level, the glass sheet may break during subsequent transportation, installation, and/or use of the unfinished glass laminate. The unfinished glass laminate can be finished as described herein to form a finished glass laminate. For example, the finishing can remove the cracks or other defects to increase the strength of the glass laminate.

As used herein, the term "edge strength" refers to the strength of a glass sheet of a glass laminate determined using a modified procedure based on the procedure described in ASTM C-158 "Standard Test Methods for Strength of Glass by Flexure (Determination of Modulus of Rupture)," which is incorporated herein by reference in its entirety. The modified procedure is generally the same as the procedure described in ASTM C-158, except for an additional calculation performed to determine the glass strength. The modified procedure comprises determining a load vs. glass stress calibration curve for the glass laminate using one of the following methods: 1) directly measuring the strain in the glass sheet (e.g., by a strain gauge) at multiple loads and then calculating stress in the glass sheet at the multiple loads using its elastic modulus, 2) directly measuring the stress in the glass sheet (e.g., by a stress optical method) at multiple loads, or 3) beam theory analysis of the glass laminate, which may be difficult due to uncertainties in the adhesive properties. The glass laminate is tested using the procedure described in ASTM C-158 to determine the load at which the glass sheet (as opposed to the complete glass laminate) fails, and the calibration curve is used to translate the determined failure load into a glass stress value, which is reported as the edge strength. In some embodiments, it may be desirable to maintain a predetermined edge strength in the glass sheet after cutting the glass laminate and an even higher predetermined edge strength after edge finishing the cut edge of the glass laminate (e.g., using the finishing process and/or apparatus described herein). For example, maintaining an edge strength of the glass sheet of at least about 100 MPa can enable the glass sheet of the glass laminate to survive end use conditions, such as handling and installation, without forming cracks and fractures in the glass sheet.

Figure 3:
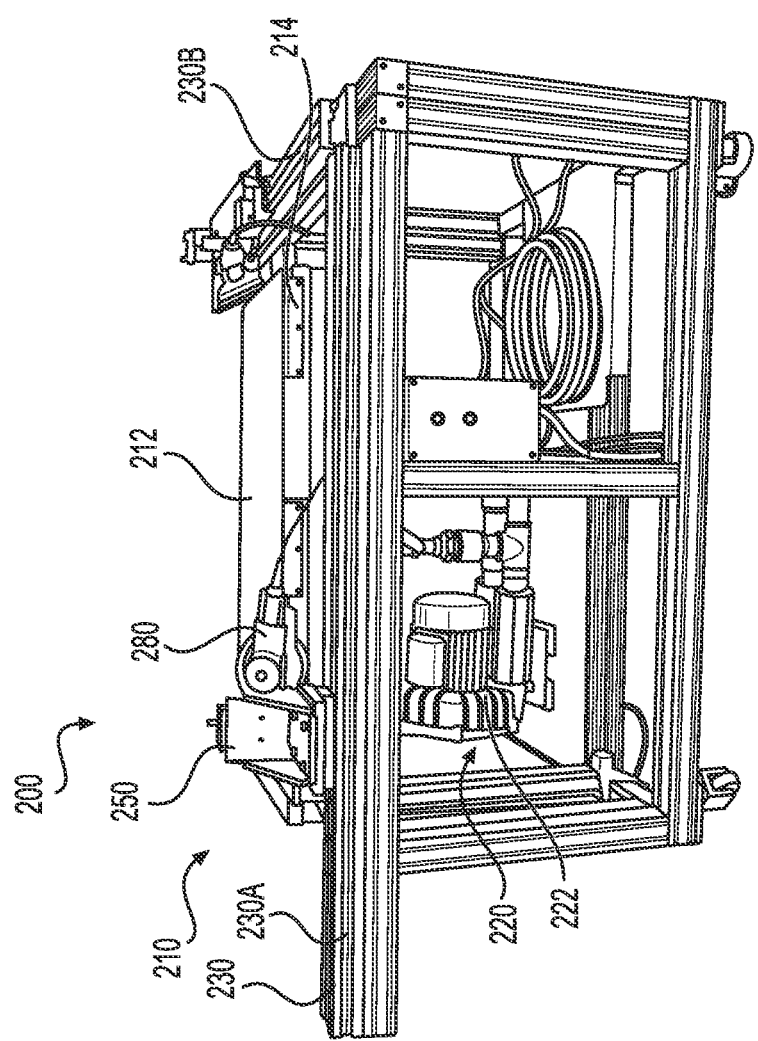
FIGS. 3-5 are perspective views of exemplary embodiments of an apparatus for finishing a cut edge of a glass laminate.
Figure 4:
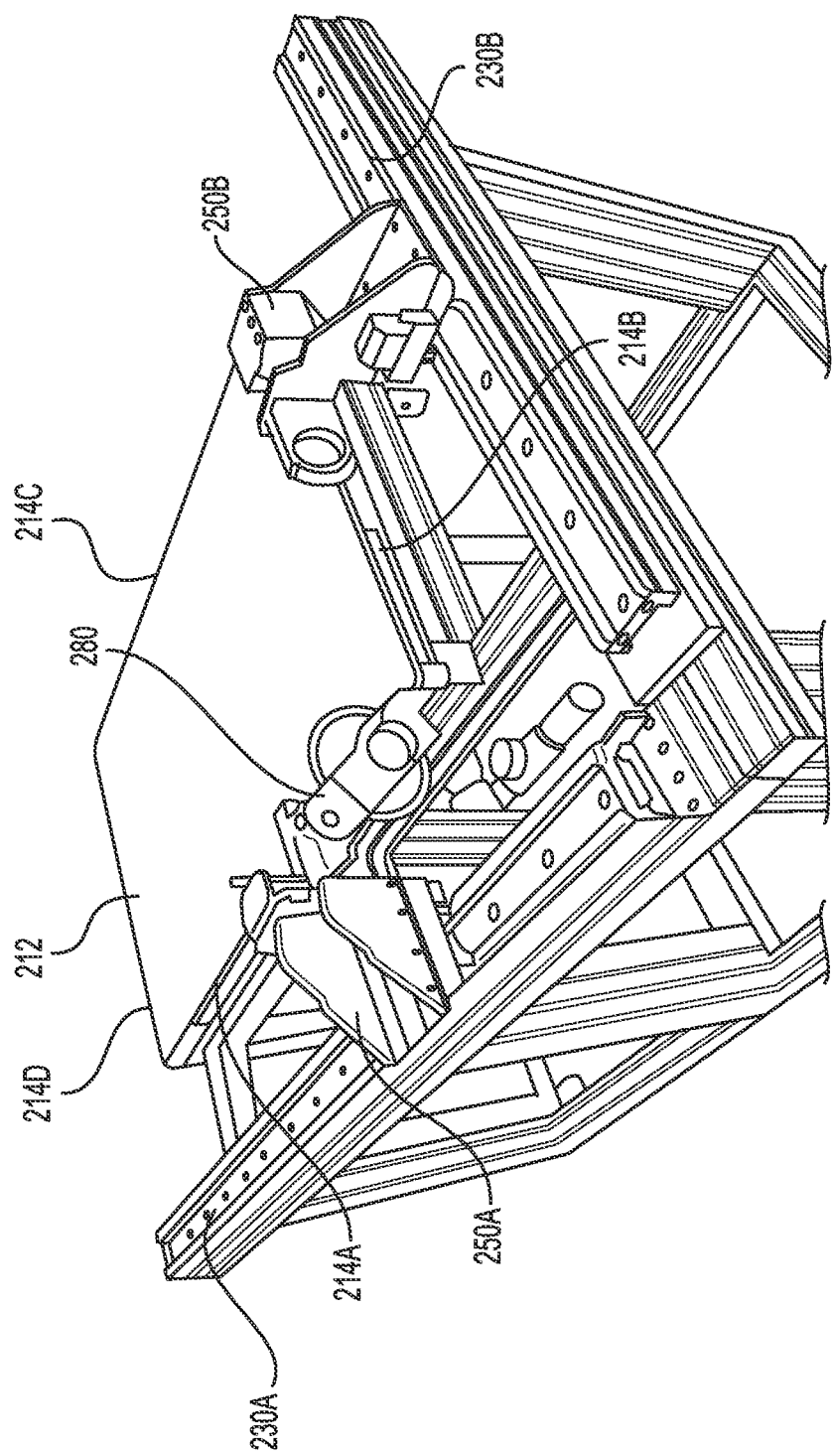
Figure 5:
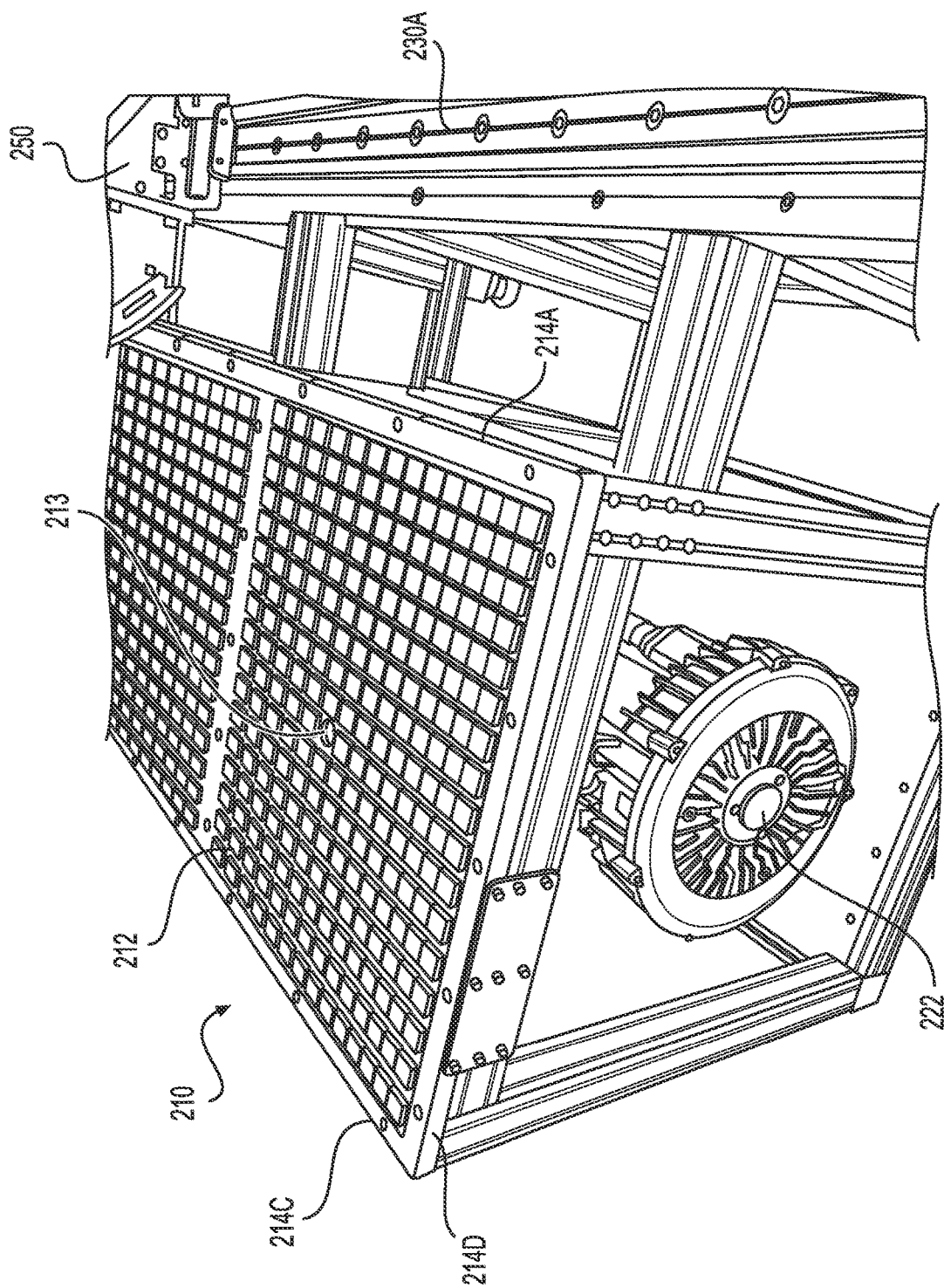

FIGS. 3-5 are perspective views of exemplary embodiments of an apparatus 200 for finishing a cut edge of a glass laminate. In some embodiments, apparatus 200 comprises a support 210 comprising a surface 212 and an edge 214. A glass laminate can be supported by and/or secured to support 210 during an edge finishing process as described herein. For example, support 210 can serve as a table or bench upon which the glass laminate can be secured during the edge finishing process. In some embodiments, surface 212 comprises a substantially planar surface. Additionally, or alternatively, edge 214 comprises a plurality of edges cooperatively defining a perimeter of support 210. For example, in the embodiments shown in FIGS. 3-5, surface 212 is substantially planar and comprises a rectangular perimeter defined by edges 214A, 214B, 214C, and 214D. In other embodiments, the surface of the support can be planar or non-planar (e.g., curved) and can comprise a determined number (e.g., 1, 2, 3, or more) of edges cooperatively defining a perimeter having a determined polygonal or non-polygonal shape (e.g., circular, elliptical, semi-circular, or triangular). Additionally, or alternatively, each edge of the surface of the support can be linear or non-linear (e.g., curved). Edge 214 can be substantially perpendicular to surface 212, as shown in FIGS. 3-5, or non-perpendicular relative to the surface.

In some embodiments, apparatus 200 comprises a vacuum system 220, which can be used to secure the glass laminate to surface 212 of support 210 as described herein. In some embodiments, vacuum system 220 comprises a vacuum unit 222. For example, vacuum unit 222 comprises a vacuum pump, a blower, or another device capable of drawing fluid (e.g., air) from one location to another to create a partial vacuum. Vacuum unit 222 is operatively coupled to surface 212 of support 210 to draw a vacuum at the surface. For example, surface 212 comprises a plurality of openings 213 therein, and vacuum unit 222 is operatively coupled to support 210 (e.g., in fluid communication with the openings) to draw fluid (e.g., air) through the openings in the surface to draw a vacuum at the surface. Thus, support 210 serves as a vacuum chuck that is capable of securing the glass laminate to surface 212 thereof as described herein.

Although apparatus 200 is described as comprising vacuum system 220 to secure glass laminate 100 to support 210, other embodiments are included in this disclosure. For example, in other embodiments, the glass laminate is secured to the support using one or more clamps or other mechanical securing devices.

In some embodiments, apparatus 200 comprises a rail 230 disposed adjacent to support 210. Rail 230 can enable movement of a finishing tool relative to support 210 during a finishing process as described herein. For example, rail 230 comprises an elongate track extending longitudinally along a rail axis to enable movement of the finishing tool along a path substantially parallel to the rail axis. In some embodiments, rail 230 comprises a plurality of rails disposed adjacent to different edges of support 210. For example, in the embodiments shown in FIGS. 3-5, rail 230 comprises a first rail 230A disposed adjacent to edge 214A of support 210 and a second rail 230B disposed adjacent to edge 214B of the support. In some embodiments, rail 230 extends substantially parallel to edge 214 of support 210. For example, in the embodiments shown in FIGS. 3-5, first rail 230A extends substantially parallel to edge 214A of support 210 and second rail 230B extends substantially parallel to edge 214B of the support. The number of rails can be the same as or different than the number of edges of the support. The positioning of the rail relative to the edge of the support can enable precise positioning of a finishing tool relative to the edge of the support during a finishing process as described herein. In some embodiments, the rail may be substantially linear or curved (e.g., to follow the shape of a curved edge of a support and/or curved cut edge of a glass laminate).

In some embodiments, apparatus 200 comprises a carrier 250 coupled to rail 230 and translatable along the rail. A finishing tool can be coupled to carrier 250 to enable movement of the finishing tool relative to support 210 during a finishing process as described herein. Additionally, or alternatively, carrier 250 can enable adjustment of the orientation of the finishing tool relative to support 210 during the finishing process also as described herein. In some embodiments, carrier 250 comprises a plurality of carriers coupled to rail 230. For example, in the embodiments shown in FIGS. 3-5, carrier 250 comprises a first carrier 250A coupled to first rail 230A and a second carrier 250B coupled to second rail 230B. The number of carriers can be the same as or different than the number of rails. For example, the number of carriers can be less than the number of rails such that a single carrier can be coupled to 2 or more rails (e.g., moved from rail to rail as needed). Also for example, the number of carriers can be greater than the number of rails such that 2 or more carriers can be coupled to a single rail.

Figure 6:
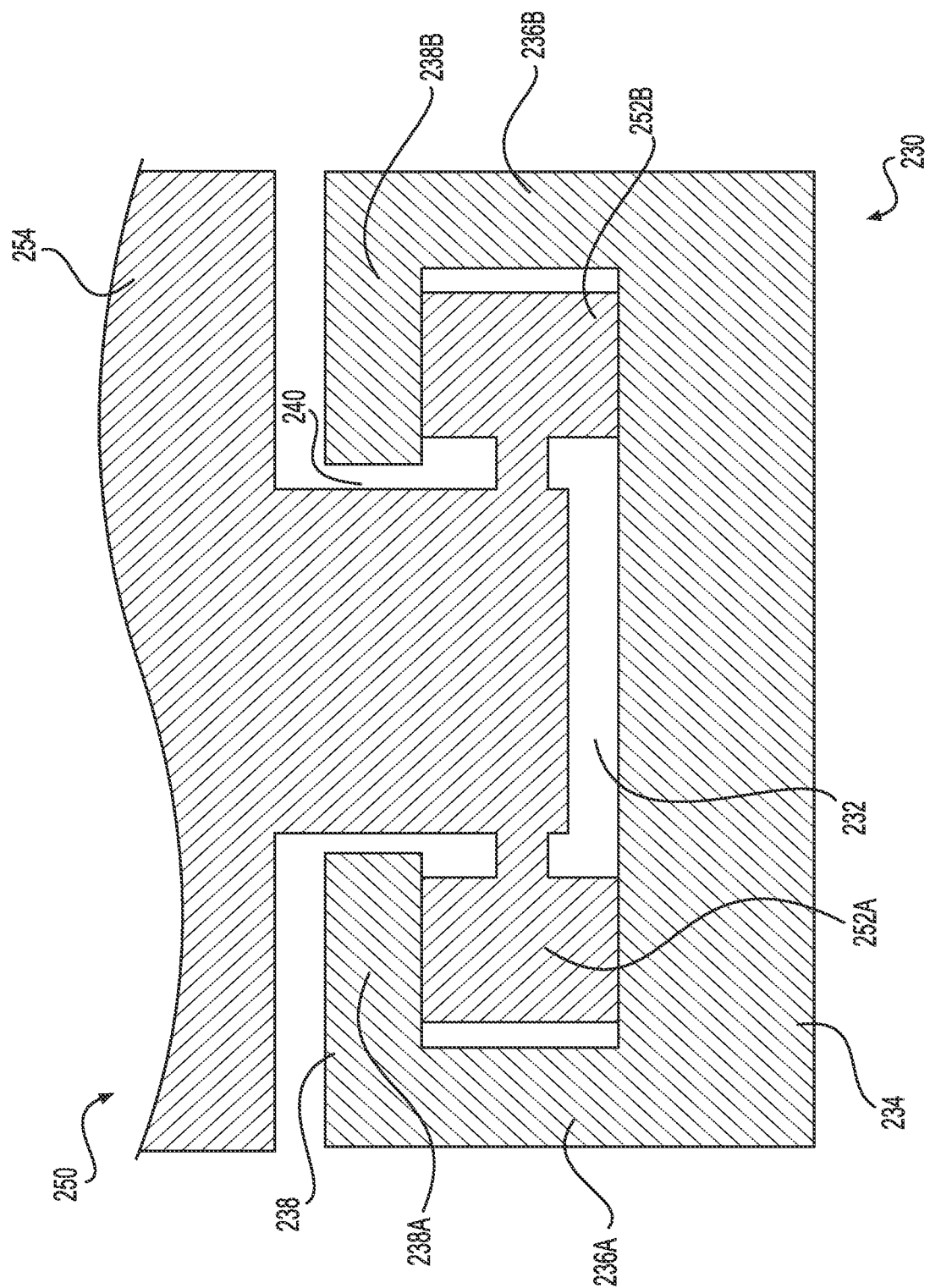
FIG. 6 is a partial schematic cross-sectional view of exemplary embodiments of an engagement between a carrier and a rail of an apparatus for finishing a cut edge of a glass laminate taken along a plane perpendicular to the rail axis.

FIG. 6 is a partial schematic cross-sectional view of exemplary embodiments of an engagement between carrier 250 and rail 230 taken along a plane perpendicular to the rail axis. In some embodiments, rail 230 comprises a channel, and carrier 250 is engaged within the channel. For example, in the embodiments shown in FIG. 6, rail 230 comprises a channel 232. In some embodiments, channel 232 is bounded on a bottom side by a floor 234 of rail 230. Additionally, or alternatively, channel 232 is bounded on a first lateral side by a first sidewall 236A of rail 230. Additionally, or alternatively, channel 232 is bounded on a second lateral side by a second sidewall 236B of rail 230. Additionally, or alternatively, channel 232 is partially bounded on a top side by a cover 238. For example, in the embodiments shown in FIG. 6, cover 238 comprises a first cover portion 238A extending from first sidewall 136A and a second cover portion 238B extending from second sidewall 236B. First cover portion 238A and second cover portion 238B are spaced from one another such that cover 238 comprises an opening 240 therein.

In some embodiments, carrier 250 is engaged within channel 232 of rail 230. For example, in the embodiments shown in FIG. 6, carrier 250 comprises a first engaging wheel 252A and a second engaging wheel 252B disposed within channel 232 of rail 230. Each of first engaging wheel 252A and second engaging wheel 252B is disposed between floor 234 and cover 238. A body 254 of carrier 250 extends through opening 240 of cover 238. Each of first engaging wheel 252A and second engaging wheel 252B is coupled to body 254 and rotatable about a rotational axis of the respective engaging wheel such that carrier 250 rolls on the engaging wheels within channel 232 to translate the carrier along rail 230. The position of first engaging wheel 252A and second engaging wheel 252B between floor 234 and cover 238 can prevent carrier 250 from becoming unengaged with rail 230. For example, cover 238 can prevent carrier 250 from moving in an upward direction away from floor 234. Additionally, or alternatively, cover 238 can prevent carrier 250 from rotating about the rail axis of rail 230 (e.g., as torque is applied to the carrier by the weight of a finishing tool coupled to the carrier).

Figure 7:
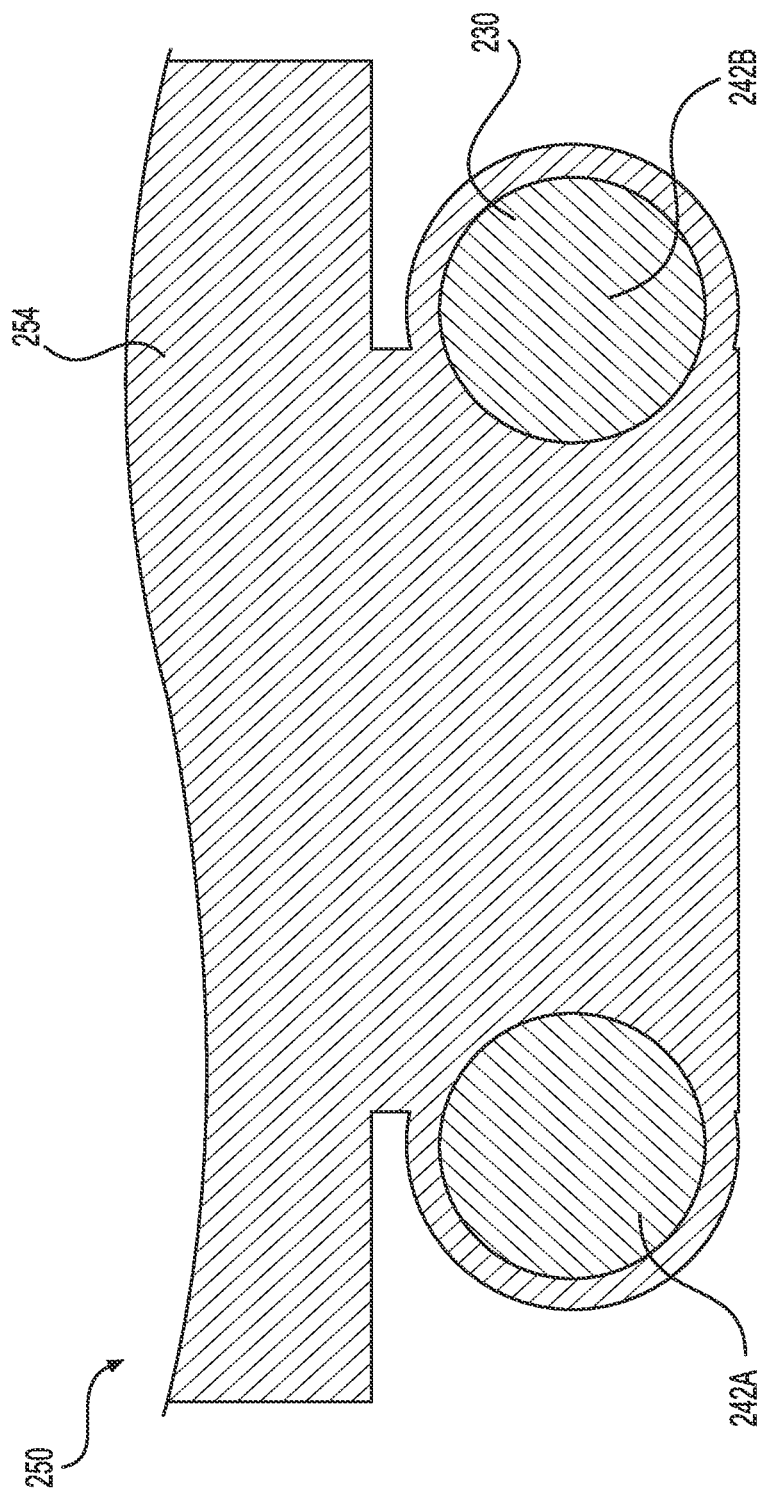
FIG. 7 is a partial schematic cross-sectional view of exemplary embodiments of an engagement between a carrier and a rail of an apparatus for finishing a cut edge of a glass laminate taken along a plane perpendicular to the rail axis.

FIG. 7 is a partial schematic cross-sectional view of other exemplary embodiments of an engagement between carrier 250 and rail 230 taken along a plane perpendicular to the rail axis. In some embodiments, rail 230 comprises one or more rods, and carrier 250 is engaged with the one or more rods. For example, in the embodiments shown in FIG. 7, rail 230 comprises a first rod 242A and a second rod 242B. Each of first rod 242A and second rod 242B is an elongate bar with a circular, elliptical, semi-circular, triangular, rectangular, or other polygonal or non-polygonal cross-sectional shape. First rod 242A and second rod 242B extend substantially parallel to each other and the rail axis.

In some embodiments, carrier 250 is engaged with the one or more rods of rail 230. For example, in the embodiments shown in FIG. 7, carrier 250 comprises a first aperture and a second aperture each extending through body 254. First rod 242A is received within the first aperture, and second rod 242B is received within the second aperture. Body 254 is configured to slide along first rod 242A and second rod 242B to translate carrier 250 along rail 230. For example, the engagement can function as a linear bearing to enable body 254 to slide along first rod 242A and second rod 242B. The multiple rods of rail 230 can prevent carrier 250 from rotating about the rail axis of the rail (e.g., as torque is applied to the carrier by the weight of a finishing tool coupled to the carrier).

In various embodiments, carrier 250 can translate along rail 230 by sliding, rolling, or another translation mechanism. Additionally, or alternatively, translation of carrier 250 along rail 230 can be manual or automatic. For example, in some embodiments, carrier 250 can be manually pushed or pulled along rail 230 by an operator. In other embodiments, carrier 250 can be pushed or pulled by a hydraulic, pneumatic, electric, or other mechanical driving system.

In some embodiments, apparatus 200 comprises a finishing tool 280 coupled to carrier 250. FIGS. 8-11 are partial perspective views of carrier 250 of apparatus 200 shown in FIGS. 3-5 with finishing tool 280 coupled thereto. Finishing tool 250 comprises an abrasive surface 282. In some embodiments, finishing tool 280 is coupled to carrier 250 such that abrasive surface 282 is positioned adjacent to edge 214 of support 210. Carrier 250 is translatable along rail 230 to translate abrasive surface 282 of finishing tool 280 relative to edge 214 of support 210. In some embodiments, finishing tool 280 comprises a first axis 284, a second axis 286 perpendicular to the first axis, and a third axis 288 perpendicular to each of the first axis and the second axis. For example, first axis 284 is substantially perpendicular to abrasive surface 282. In some embodiments, abrasive surface 282 is non-planar as described herein. In such embodiments, an axis "perpendicular" to abrasive surface is an axis of rotational symmetry of the abrasive surface (e.g., the axis from which the abrasive surface is tapered). In some embodiments, finishing tool 280 comprises a rotary finishing tool. In some of such embodiments, first axis 284 is a rotational axis of abrasive surface 282. For example, in the embodiment shown in FIGS. 8-11, finishing tool 280 comprises a rotary sander, and first axis 284 is a rotational axis of the sanding disk. In other embodiments, the finishing tool comprises a rotary drum, and the rotational axis is perpendicular to the rotational axis. In yet other embodiments, the finishing tool comprises a non-rotary finishing tool. For example, the finishing tool comprises a belt sander without a rotational axis.

Figure 12:
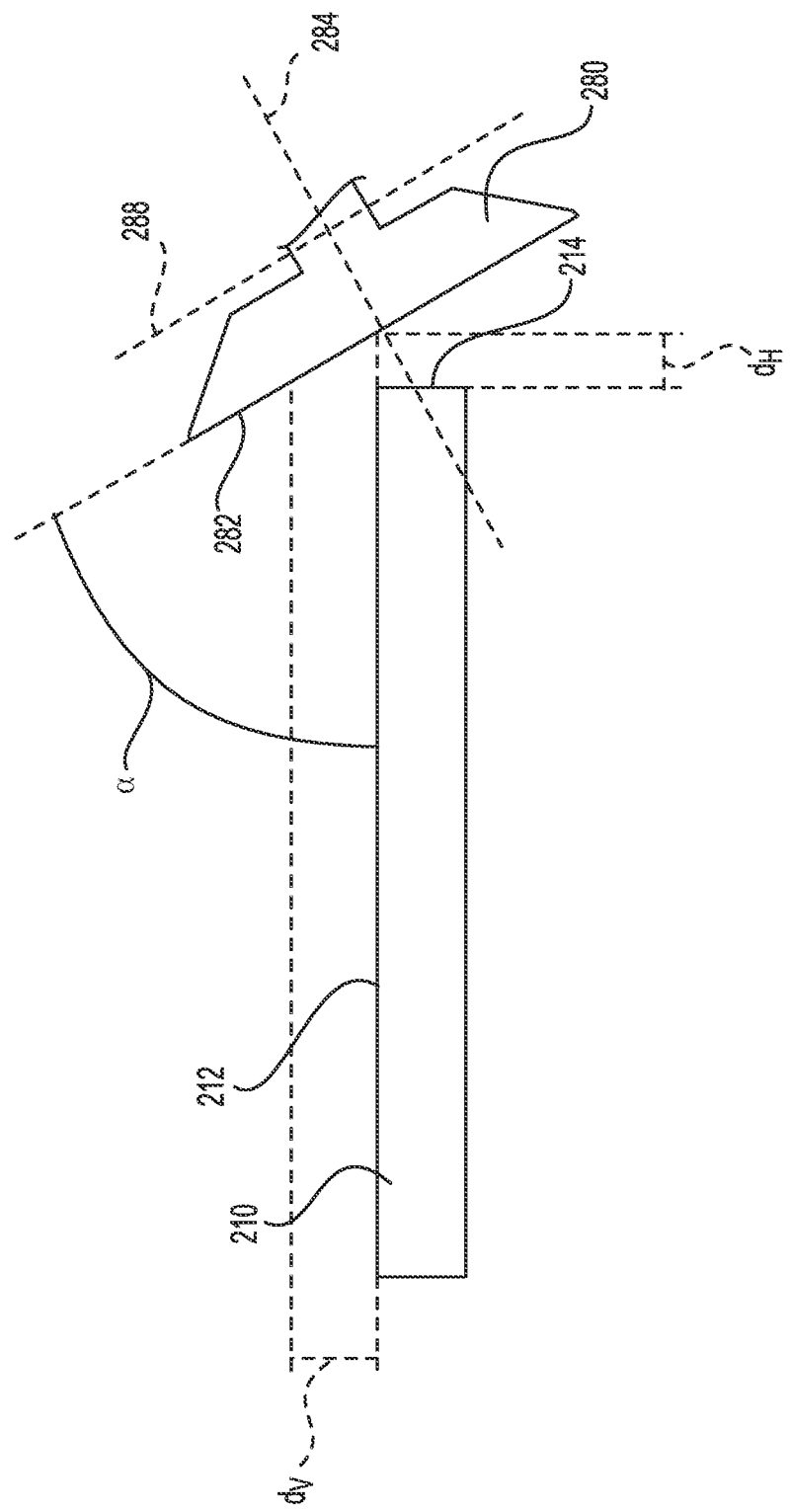
FIGS. 12 and 13 are schematic side and top views, respectively, of exemplary embodiments of a finishing tool positioned adjacent a support.
Figure 13:
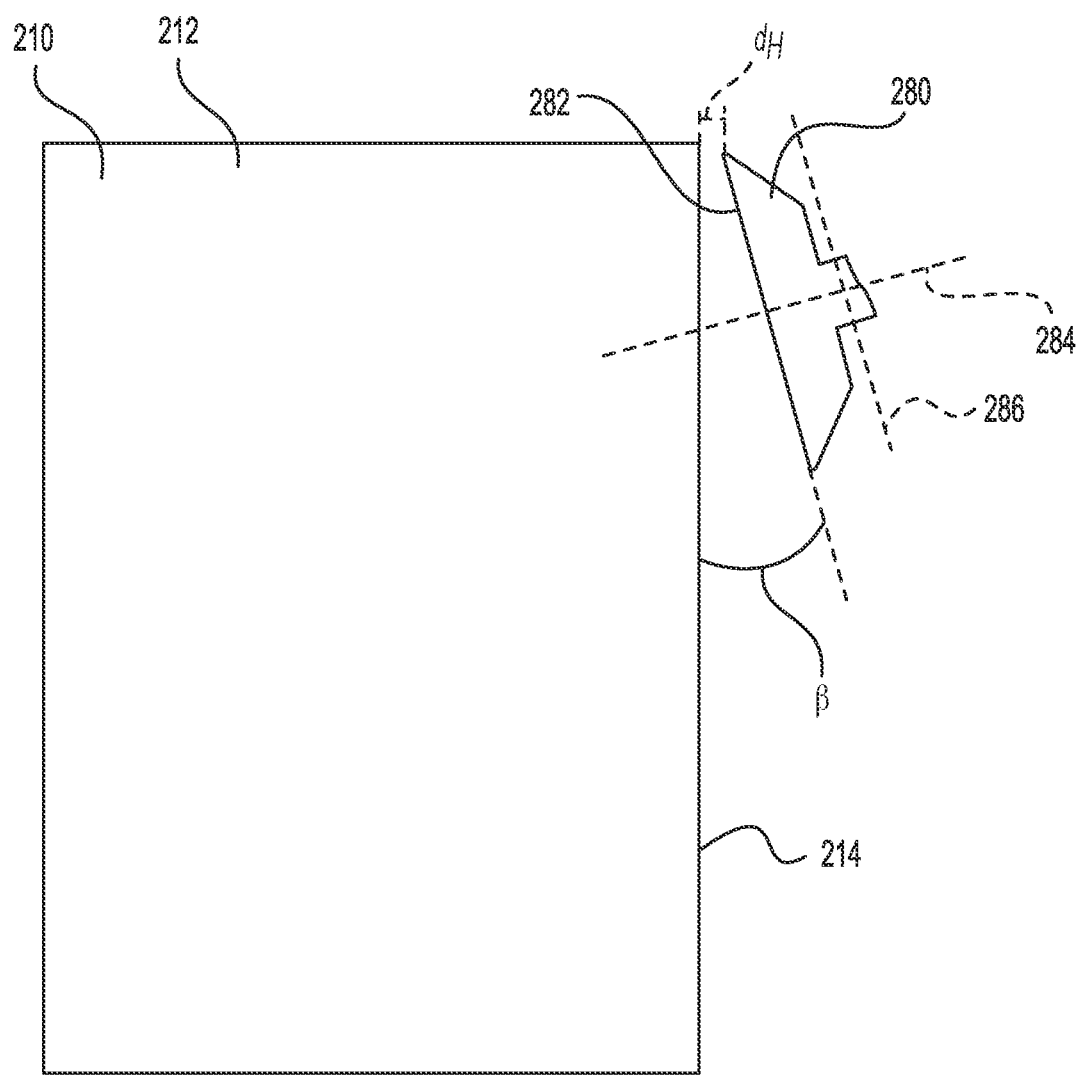

In some embodiments, finishing tool 280 is coupled to carrier 250 to achieve a determined orientation of abrasive surface 282 relative to support 210. FIGS. 12-13 are schematic side and top views, respectively, of exemplary embodiments of finishing tool 280 positioned adjacent support 210. In some embodiments, finishing tool 280 is oriented relative to support 210 such that an angle α is formed between abrasive surface 282 of the finishing tool and surface 212 of the support. For example, angle α is an angle between abrasive surface 282 and surface 212 of support 210, measured along a plane perpendicular to the surface of the support and including the rotational axis of finishing tool 280 (e.g., first axis 284) as shown in FIG. 12. In some embodiments, abrasive surface 282 is substantially parallel to third axis 288 of finishing tool 280. In some of such embodiments, angle α is an angle between third axis 288 and surface 212 of support 210. For example, angle α is an angle between third axis 288 and surface 212 of support 210, measured along a plane perpendicular to the surface of the support and including the rotational axis of finishing tool 280 (e.g., first axis 284). In some embodiments, angle α is greater than 0°, at least about 5°, at least about 10°, at least about 15°, at least about 20°, at least about 25°, at least about 30°, at least about 35°, at least about 40°, or at least about 45°. Additionally, or alternatively, angle α is less than 90°, at most about 85°, at most about 80°, at most about 75°, at most about 70°, at most about 65°, at most about 60°, at most about 55°, at most about 50°, or at most about 45°.

In some embodiments, finishing tool 280 is oriented relative to support 210 such that abrasive surface 282 is spaced from edge 214 by a distance $d_H$ (e.g., a horizontal distance) and from surface 212 by a distance $d_V$ (e.g., a vertical distance) as shown in FIGS. 12-13. Distances $d_H$ and $d_V$ can be determined to according to the thickness of glass laminate 100. Such spacing can enable proper engagement between abrasive surface 282 and glass laminate 100 during a finishing process as described herein.

In some embodiments, finishing tool 280 is oriented relative to support 210 such that an angle β is formed between abrasive surface 282 of the finishing tool and edge 214 of the support. For example, angle β is an angle between abrasive surface 282 and edge 214 of support 210 (or a plane including the edge of the support), measured along a plane parallel to surface 212 of the support as shown in FIG. 13.

In some embodiments, the plane parallel to surface 212 of support 210 includes second axis 286 of finishing tool 280 as shown in FIG. 13. In some embodiments, abrasive surface 282 is substantially parallel to second axis 286 of finishing tool 280. In some of such embodiments, angle β is an angle between second axis 286 and edge 214 of support 210. For example, angle β is an angle between second axis 286 and edge 214 of support 210 (or a plane including the edge of the support), measured along a plane parallel to surface 212 of the support. In some embodiments, angle β is greater than 0°, at least about 1°, at least about 2°, at least about 3°, at least about 4°, at least about 5°, at least about 6°, at least about 7°, at least about 8°, at least about 9°, at least about 10°, at least about 15°, at least about 20°, at least about 25°, at least about 30°, at least about 35°, at least about 40°, or at least about 45°. Additionally, or alternatively, angle β is less than 90°, at most about 85°, at most about 80°, at most about 75°, at most about 70°, at most about 65°, at most about 60°, at most about 55°, at most about 50°, at most about 45°, at most about 40°, at most about 35°, at most about 30°, at most about 25°, at most about 20°, at most about 15°, or at most about 10°. If angle β is too large, the contact area between abrasive surface 282 and glass laminate 100 during a finishing process as described herein can be too small, which can result in excess force being applied to the glass laminate and poor edge quality. Maintaining angle β below about 30° can help to avoid such insufficient contact area.

In some embodiments, carrier 250 is adjustable to adjust the orientation of finishing tool 280 relative to support 210. For example, in the embodiments shown in FIGS. 8-11, carrier 250 is adjustable to rotate finishing tool 280 about second axis 286 and about third axis 288. Rotating finishing tool 280 about second axis 286 can change angle α. Rotating finishing tool 280 about third axis 288 can change angle β. Thus, in the embodiments shown in FIGS. 8-11, carrier 250 is adjustable to adjust angle α and angle β.

In some embodiments, rail 230 is adjustable to adjust the orientation of finishing tool 280 relative to support 210. For example, in some embodiments, rail 230 is rotatable about the rail axis to adjust angle α.

Figure 10:
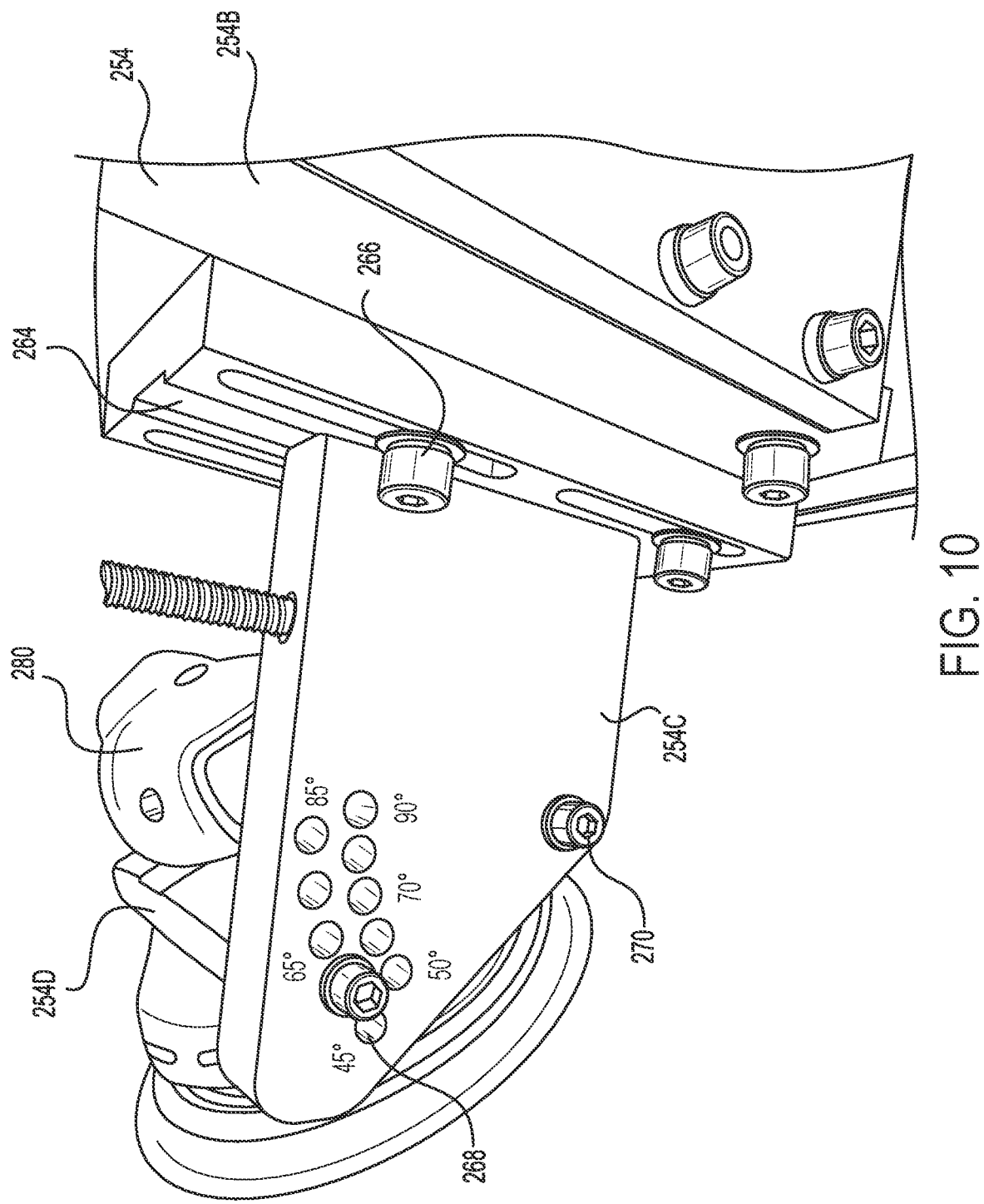
Figure 11:
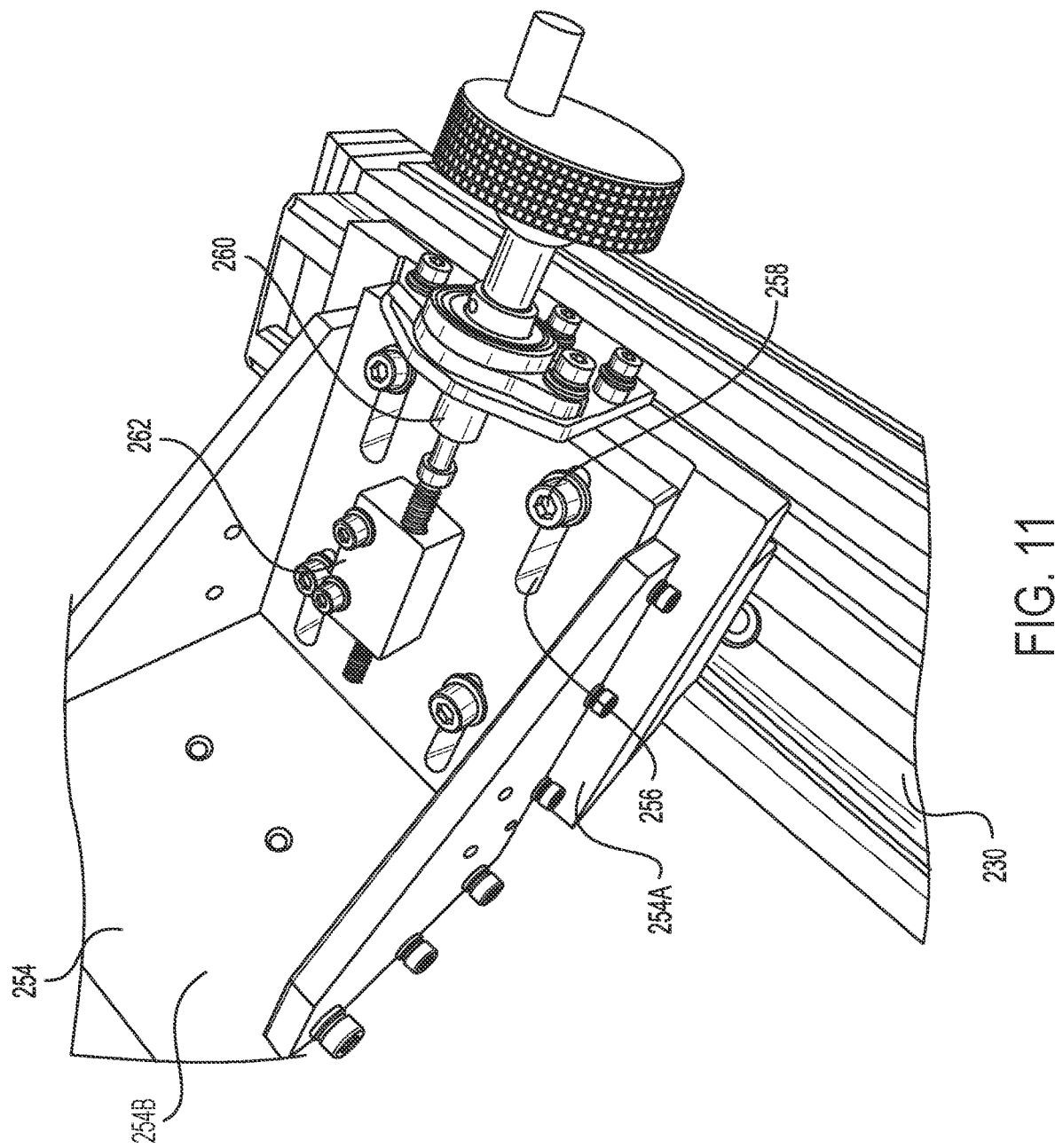

In some embodiments, body 254 of carrier 250 comprises a base 254A and an extension 254B. Base 254A is coupled to rail 230 as described herein to enable carrier 250 to translate relative to the rail. Extension 254B is coupled to base 254A. Base 254A and extension 254B can be separate components or portions of a unitary component. In some embodiments, extension 254B is movable relative to base 254A. For example, in the embodiments shown in FIGS. 8-11, extension 254B is movable relative to base 254A in directions toward and/or away from edge 214 of support 210. Such movement can enable carrier 250 to be adjusted to adjust distance $d_H$ between abrasive surface 282 of finishing tool 280 and edge 214 of support 210 and or to adjust distance $d_V$ between the abrasive surface of the finishing tool and surface 212 of the support. In some embodiments, extension 254B comprises one or more elongate apertures 256, and the extension is coupled to base 254A with one or more fasteners 258 disposed within the elongate apertures as shown in FIG. 11. For example, elongate apertures 256 are configured as slotted openings comprising long axes extending perpendicular to the rail axis of rail 230 and/or perpendicular to edge 214 of support 210. Additionally, or alternatively, fasteners 258 comprise bolts, screws, rivets, or other fastening devices. The position of fasteners 258 within elongate apertures 256 enables extension 254B of body 254 to slide relative to base 254A in a direction toward support 210 to reduce distance $d_H$ or in a direction away from the support to increase distance $d_H$. In some embodiments, carrier 250 comprises a sliding mechanism to control movement of extension 254B relative to base 254A. For example, in the embodiments shown in FIG. 11, carrier 250 comprises a screw mechanism 260 that is coupled to base 254A and threaded into a threaded opening of a receptacle 262 coupled to extension 254B such that rotation of the screw mechanism causes a corresponding translation of the extension relative to the base.

In some embodiments, body 254 of carrier 250 comprises a support arm. Finishing tool 280 can be coupled to the support arm such that the orientation of the finishing tool relative to support 210 is adjustable. For example, in the embodiments shown in FIGS. 8-11, body 254 of carrier 250 comprises a first support arm 254C coupled to extension 254B and a second support arm 254D coupled to the first support arm. First support arm 254C and second support arm 254D can enable the orientation of finishing tool 280 relative to support 210 to be adjusted in multiple dimensions (e.g., rotated about multiple axes) as described herein. In some embodiments, first support arm 254C is adjustable relative to extension 254B to rotate finishing tool 280 about third axis 288 to adjust angle β. For example, in the embodiments shown in FIGS. 8 and 10, first support arm 254C comprises a mounting plate 264 coupled to extension 254B by one or more fasteners 266, which can be adjusted (with or without installing one or more shims between the mounting plate and the extension) to swing the first support arm in an arc about the extension, thereby rotating finishing tool 280 about second axis 286. In some embodiments, second support arm 254D is adjustable relative to first support arm 254C to rotate finishing tool 280 about second axis 286 to adjust angle α. For example, in the embodiments shown in FIGS. 8 and 10, first support arm 254C comprises a plurality of adjustment apertures 268, and second support arm 254D is coupled to the first support arm at a pivot pin 270 and at one of the adjustment apertures with a fastener. Changing the adjustment aperture to which second support arm 254D is coupled causes the second support arm to pivot about pivot pin 270, thereby rotating finishing tool 280 about third axis 288.

Figure 8:
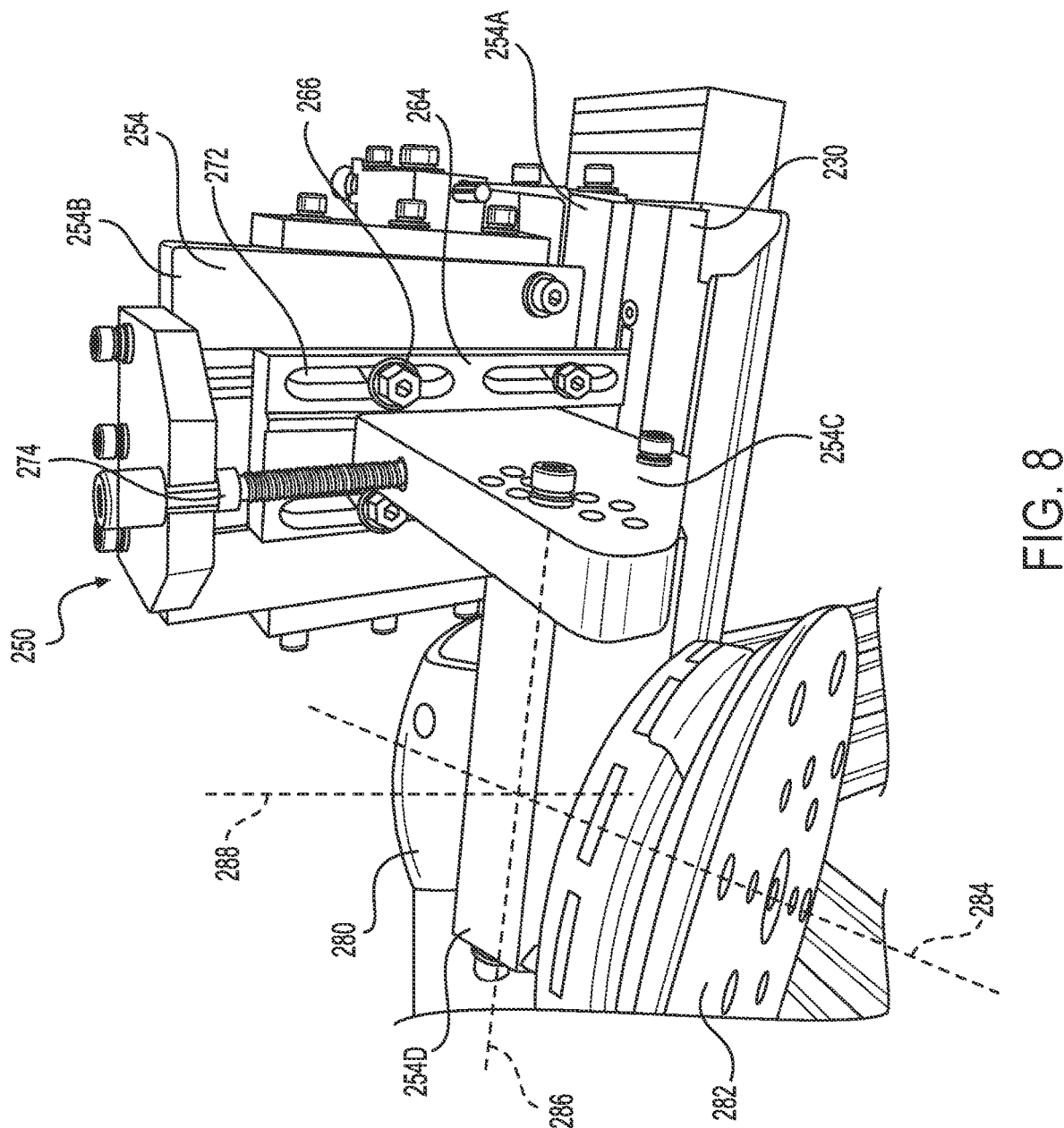
FIGS. 8-11 are partial perspective views of a carrier of the apparatus of FIGS. 3-5 with a finishing tool coupled thereto.
Figure 9:
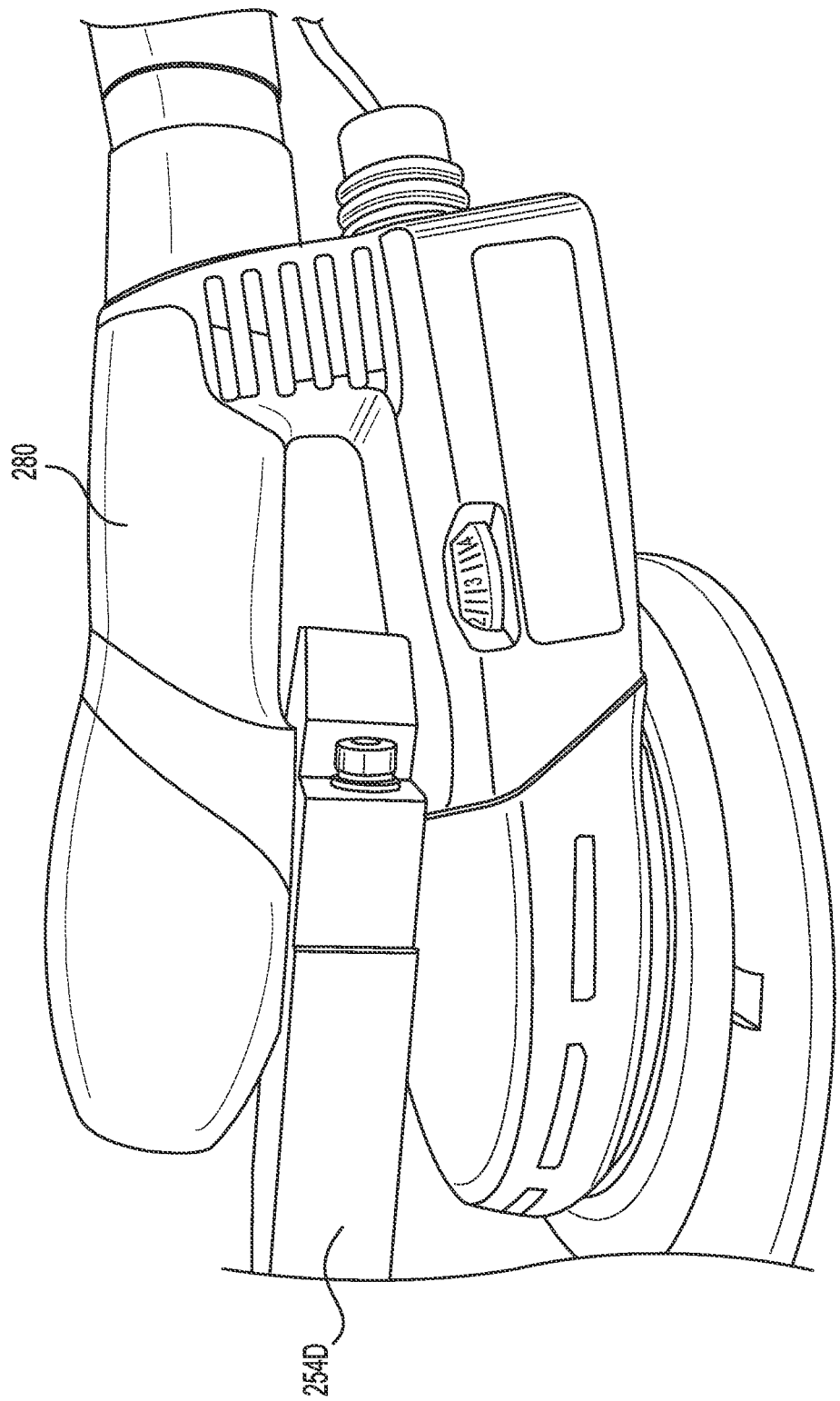

In some embodiments, the support arm is adjustable relative to the extension to move the finishing tool in directions toward and/or away from the rail (e.g., vertical directions). For example, in the embodiments shown in FIGS. 8-11, first support arm 254C is movable relative to extension 254B in directions toward and/or away from rail 230. Such movement can enable carrier 250 to be adjusted to adjust distance $d_H$ between abrasive surface 282 of finishing tool 280 and edge 214 of support 210 and or to adjust distance $d_V$ between the abrasive surface of the finishing tool and surface 212 of the support. In some embodiments, mounting plate 264 comprises one or more elongate apertures 272, and first support arm 254C is coupled to extension 254B with one or more fasteners 266 disposed within the elongate apertures as shown in FIGS. 8 and 10. For example, elongate apertures 272 are configured as slotted openings comprising long axes extending perpendicular to the rail axis of rail 230 and/or perpendicular to surface 212 of support 210. The position of fasteners 266 within elongate apertures 272 enables first support arm 254C of body 254 to slide relative to extension 254B in a direction toward rail 230 to reduce distance door in a direction away from the rail to increase distance $d_V$. In some embodiments, carrier 250 comprises a sliding mechanism to control movement of first support arm 254C relative to extension 254B. For example, in the embodiments shown in FIGS. 8 and 10, carrier 250 comprises a screw mechanism 274 that is coupled to extension 254B and threaded into a threaded opening disposed in first support arm 254C such that rotation of the screw mechanism causes a corresponding translation of the first support arm relative to the extension.

Although carrier 250 is described in reference to FIGS. 8-11 as comprising base 254A, extension 254B, first support arm 254C, and second support arm 254D to cooperatively enable adjustment of the orientation of finishing tool 280 relative to surface 210 to adjust distance $d_H$, distance $d_V$, angle α, and angle β, other embodiments are included in this disclosure. For example, in other embodiments, such adjustment in multiple dimensions can be achieved by a swivel, ball and socket, or other adjustable coupling between the base and the extension and/or between the base and the support arm. In such embodiments, the carrier can comprise a single support arm, or the support arm can be omitted entirely. However, the configuration of carrier 250 described in reference to FIGS. 8-11 can enable a robust coupling between the various components or the carrier to avoid unintended repositioning of finishing tool 280 relative to support 210 (e.g., resulting from slippage of a swivel, ball and socket, or other coupling between components).

Figure 14:
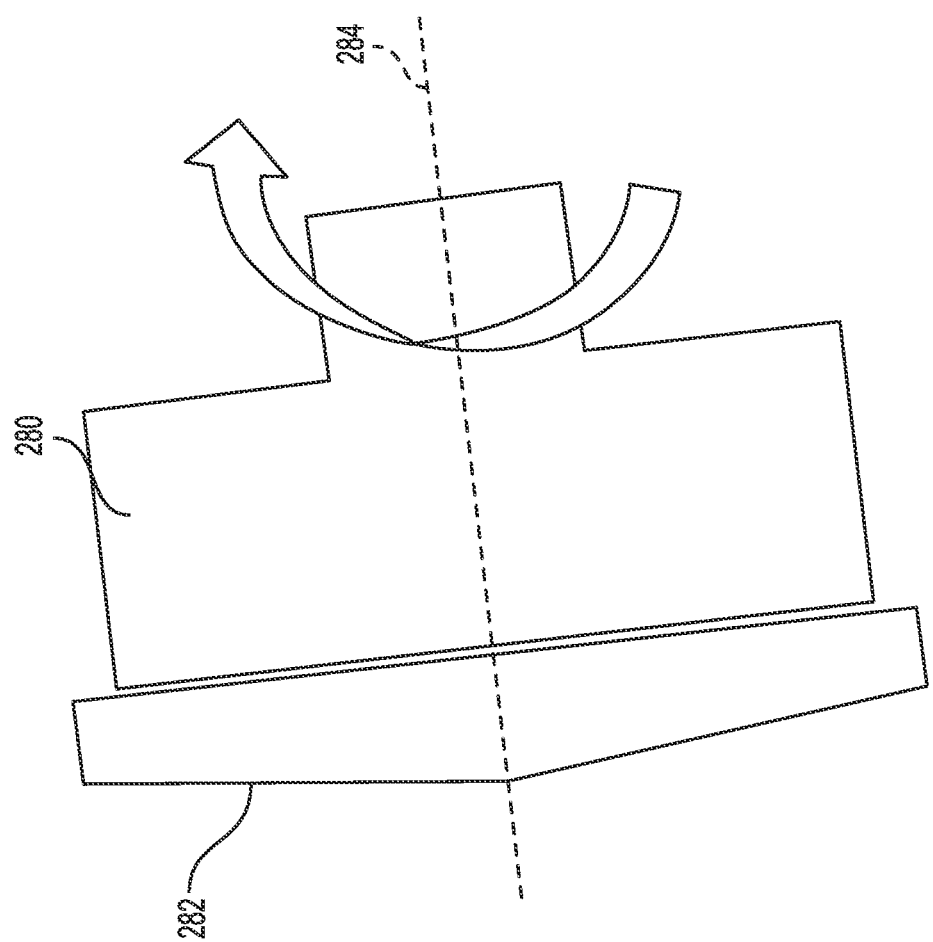
FIG. 14 is a partial schematic side view of exemplary embodiments of a finishing tool.

FIG. 14 is a partial schematic side view of exemplary embodiments of finishing tool 280. In some embodiments, abrasive surface 282 of finishing tool 280 is non-planar. For example, in the embodiments shown in FIG. 14, abrasive surface 282 is tapered in a direction outward from the rotational axis (e.g., first axis 284) toward a periphery or perimeter of the abrasive surface. For example, abrasive surface 282 comprises an apex disposed at the rotational axis and tapers away from the apex toward the periphery of the abrasive surface. Such a taper can help to enable contacting the glass laminate with a portion of the abrasive surface that is moving in a direction that puts the glass sheet of the glass laminate in compression (e.g., a downward direction toward the non-glass substrate) while avoiding contact between a portion of the abrasive surface that is moving in a direction that puts the glass sheet in tension (e.g., an upward direction away from the non-glass substrate) during a finishing process as described herein. In some embodiments, a taper of abrasive surface 282 is at least about 3°, at least about 4°, at least about 5°, or at least about 6°. Additionally, or alternatively, a taper of abrasive surface 282 is at most about 20°, at most about 15°, at most about 10°, at most about 9°, at most about 8°, or at most about 7°.

Figure 15:
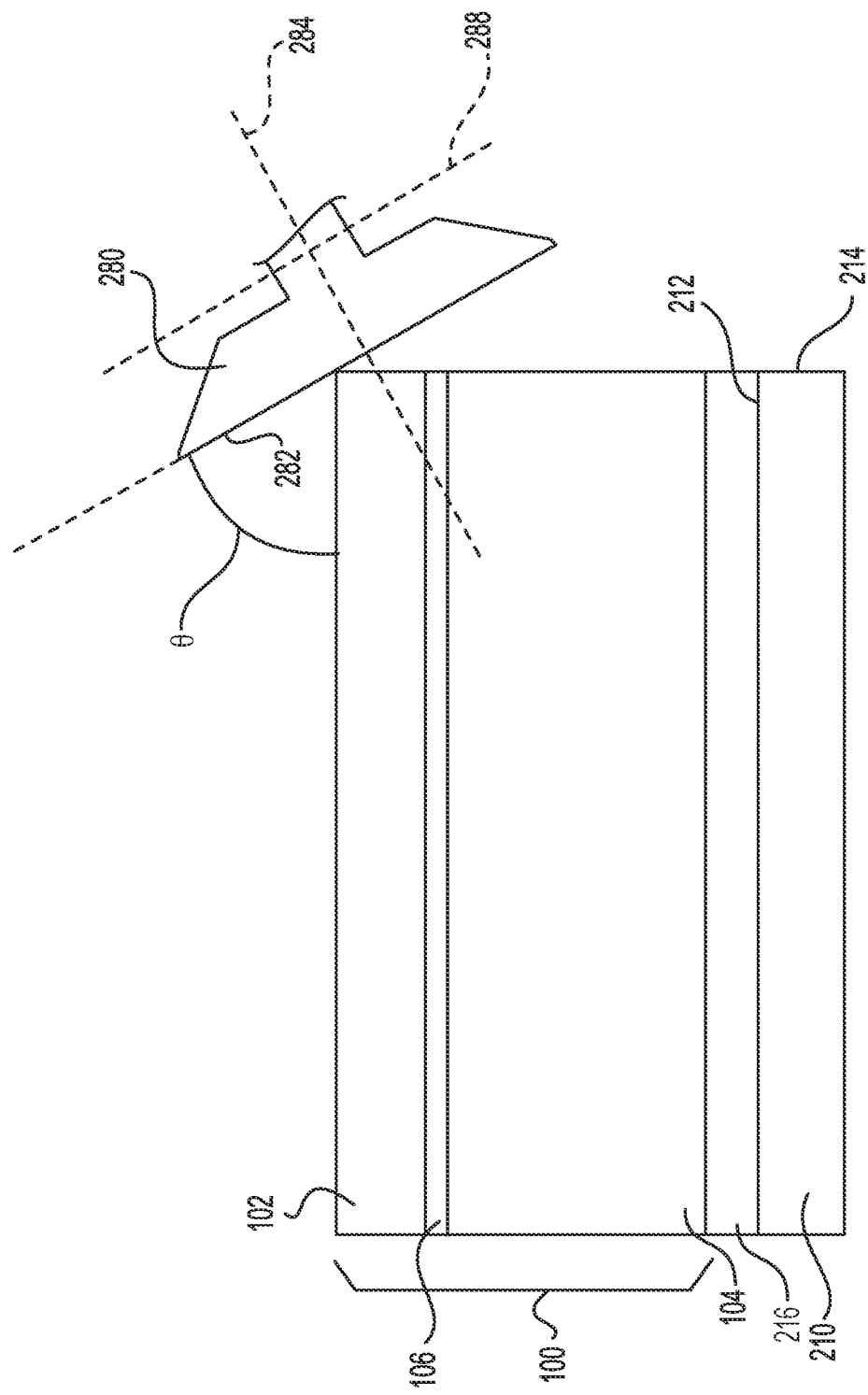
FIGS. 15 and 16 are schematic side and top views, respectively, of a glass laminate during various stages of exemplary embodiments of a finishing process.
Figure 16:
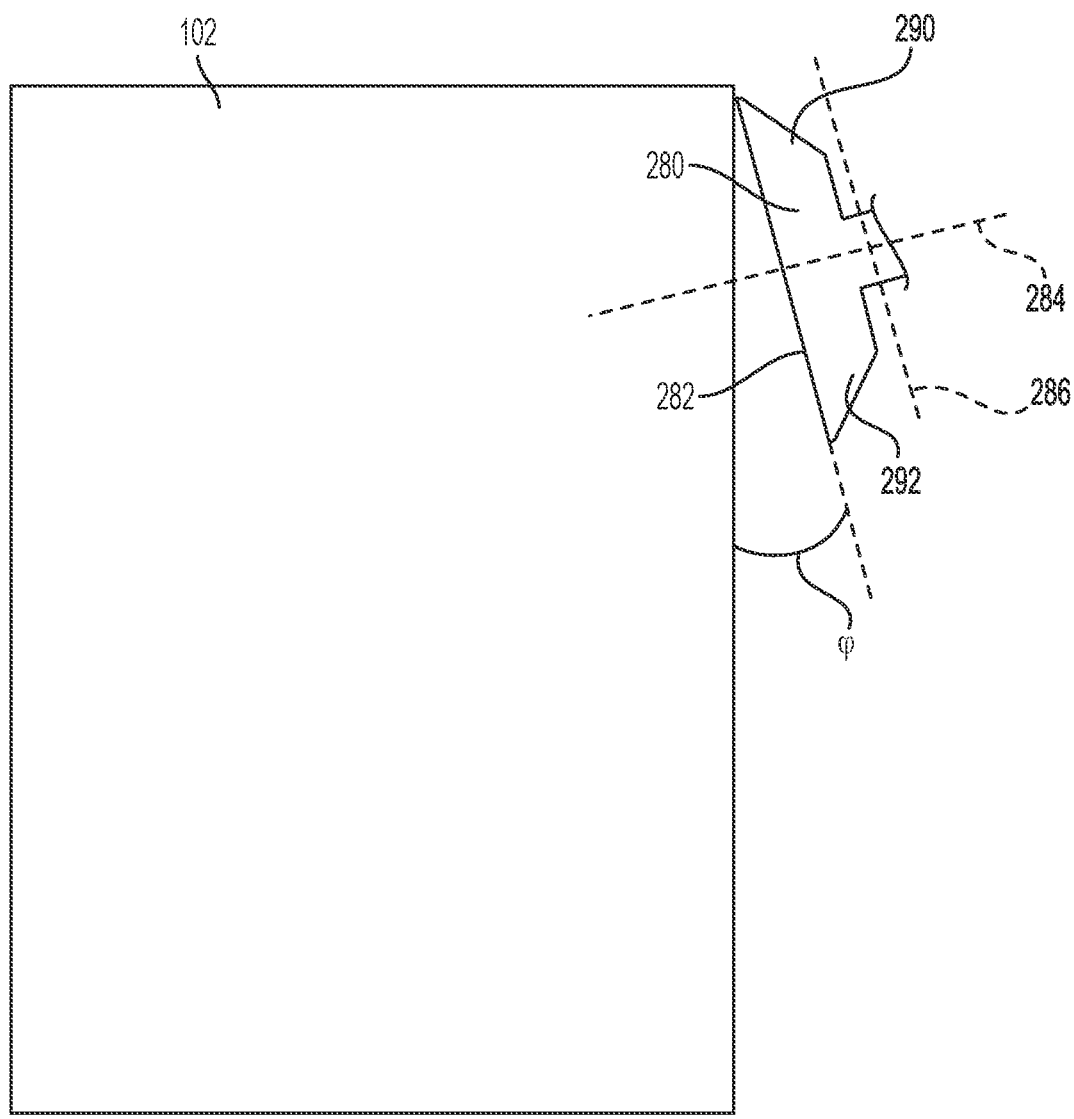

FIGS. 15 and 16 are schematic side and top views, respectively, of glass laminate 100 during various stages of some embodiments of a finishing process. In some embodiments, a method comprises securing glass laminate 100 to support 210. For example, the method comprises securing glass laminate 100 to surface 212 of support 210 as shown in FIG. 15. In some embodiments, securing glass laminate 100 to support 210 comprises drawing a vacuum between the glass laminate and the support (e.g., using vacuum system 220, a clamp, or another securing device as described herein). In some embodiments, a buffer material 216 is disposed between glass laminate 100 and support 210. For example, buffer material 216 comprises medium density fiberboard (MDF) material. The MDF material can be a sacrificial layer. For example, during the finishing process, abrasive surface 282 of finishing tool 280 can contact the MDF material without damaging underlying support 210. In some embodiments, buffer material 216 is a porous material to enable a vacuum to be drawn between glass laminate 100 and support 210. In other embodiments, the buffer material is omitted, and the glass laminate is secured directly to the support.

In some embodiments, the edge of glass laminate 100 is substantially aligned with edge 214 of support 210 as shown in FIG. 15. Thus, there is substantially no offset between the edge of glass laminate 100 and edge 214 of support 210. In other embodiments, the edge of the glass laminate is offset from the edge of the support. For example, the glass laminate is positioned on the support such that the support extends beyond the glass laminate. Such a configuration can be referred to as a negative offset and denoted by a negative distance. Alternatively, the glass laminate is positioned on the support such that the glass laminate extends beyond the support. Such a configuration can be referred to as a positive offset and denoted by a positive distance. In some embodiments, the offset is about −5 mm to about +30 mm. An negative offset of more than 5 mm (e.g., an offset of less than −5 mm) can cause undesirable contact between the abrasive surface of the finishing tool and the support. A positive offset of more than 30 mm can result in excessive vibration at the edge of the glass laminate, which can cause the glass sheet to fracture.

In some embodiments, the method comprises contacting an edge of glass laminate 100 with abrasive surface 282 of finishing tool 280. The edge can be a cut edge of glass laminate 100, which can have cracks or other defects resulting from a cutting process as described herein.

In some embodiments, the contacting comprises orienting finishing tool 280 relative to glass laminate 100 such that an angle θ is formed between abrasive surface 282 of the finishing tool and an outer surface (e.g., surface 103A or surface 105B) of the glass laminate. For example, angle θ is an angle between abrasive surface 282 and surface 103A of glass sheet 102 of glass laminate 100, measured along a plane perpendicular to the surface of the glass laminate and including the rotational axis of finishing tool 280 (e.g., first axis 284) as shown in FIG. 15. In some embodiments, abrasive surface 282 is substantially parallel to third axis 288 of finishing tool 280. In some of such embodiments, angle θ is an angle between third axis 288 and the outer surface of glass laminate 100. For example, angle θ is an angle between third axis 288 and surface 103A of glass sheet 102 of glass laminate 100, measured along a plane perpendicular to the surface of the glass laminate and including the rotational axis of finishing tool 280 (e.g., first axis 284). In some embodiments, angle θ can have any of the values described herein in reference to angle α. Additionally, or alternatively, the method comprises adjusting angle θ (e.g., by adjusting carrier 250 as described herein).

In some embodiments, the contacting comprises orienting finishing tool 280 relative to glass laminate 100 such that an angle φ is formed between abrasive surface 282 of the finishing tool and edge 214 of the glass laminate. For example, angle φ is an angle between abrasive surface 282 and the edge of glass laminate 100 (or a plane including the edge of the glass laminate), measured along a plane parallel to surface 103A of the glass laminate as shown in FIG. 16. In some embodiments, the plane parallel to surface 103A of glass laminate 100 includes second axis 286 of finishing tool 280 as shown in FIG. 16. In some embodiments, abrasive surface 282 is substantially parallel to second axis 286 of finishing tool 280. In some of such embodiments, angle φ is an angle between second axis 286 and the edge of glass laminate 100. For example, angle φ is an angle between second axis 286 and the edge of glass laminate 100 (or a plane including the edge of the glass laminate), measured along a plane parallel to surface 103A of the glass laminate. In some embodiments, angle φ can have any of the values described herein in reference to angle β. Additionally, or alternatively, the method comprises adjusting angle φ (e.g., by adjusting carrier 250 as described herein).

In some embodiments, abrasive surface 282 of finishing tool 280 is oriented to apply a force to glass sheet 102 of glass laminate 100 in a direction toward non-glass substrate 104 during the contacting. For example, in the embodiments shown in FIG. 16, abrasive surface 282 is bisected by a bisecting plane including first axis 284 and third axis 288 such that during rotation, a first portion 290 of the abrasive surface disposed on one side of the bisecting plane is moving substantially in the direction toward non-glass substrate 104 (e.g., a downward direction) and a second portion 292 of the abrasive surface disposed on an opposing side of the bisecting plane is moving in a direction away from the non-glass substrate (e.g., an upward direction). In some embodiments, finishing tool 280 is oriented such that first portion 290 of abrasive surface 282 contacts glass sheet 102 of glass laminate 100, and second portion 292 of the abrasive surface does not contact the glass sheet of the glass laminate. Thus, only the portion of the abrasive surface moving substantially in the direction toward non-glass substrate 104 contacts glass sheet 102, thereby applying the force to the glass sheet in the direction toward the non-glass substrate. Such an orientation of the finishing tool relative to the glass laminate can enable the glass sheet to be maintained in a state of compression during the contacting, which can help to avoid fracturing the glass sheet. In some embodiments, abrasive surface 282 of finishing tool 280 is tapered as described herein in reference to FIG. 14, which can help to avoid contact between second portion 292 of the abrasive surface to avoid putting the glass in tension.

In some embodiments, the contacting comprises applying a fluid to abrasive surface 282 and/or the cut edge of glass laminate 100. For example, the contacting comprises spraying water onto abrasive surface 282 and the cut edge of glass laminate 100 during the contacting the cut edge of the glass laminate with the abrasive surface. The fluid can help to lubricate the contact between the abrasive surface and the glass laminate and/or to remove glass or other particles removed from the glass laminate during edge finishing, which can improve the quality of the finished edge.

Figure 17:
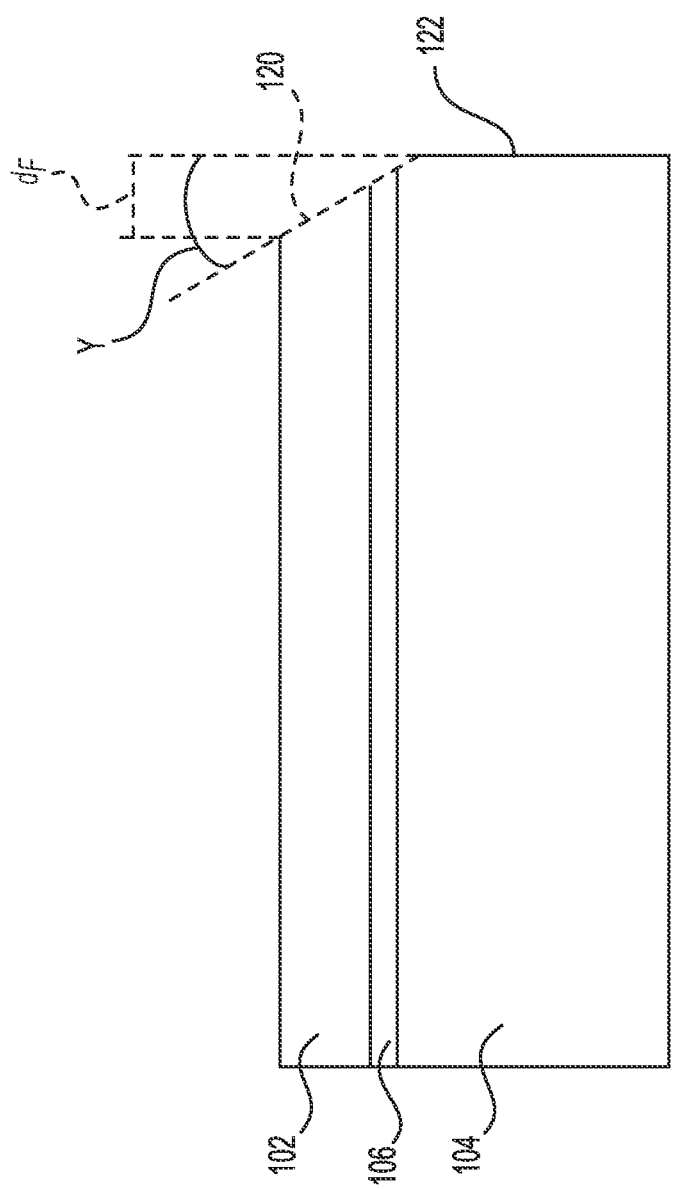
FIG. 17 is a side perspective view of a glass laminate following exemplary embodiments of a finishing process.

In some embodiments, the method comprises translating carrier 250 along rail 230 substantially parallel to edge 214 of support 210 to move abrasive surface 282 along the edge of glass laminate. In some of such embodiments, the method comprises maintaining contact between abrasive surface 182 and glass laminate 100 during the translating. Additionally, or alternatively, the method comprises operating finishing tool to rotate or otherwise move abrasive surface 282 during the translating. FIG. 17 is a side perspective view of glass laminate 100 following the translating. In some embodiments, such translation removes a portion of glass sheet 102 of glass laminate 100 to transform the cut edge of the glass laminate into a finished edge.

In some embodiments, the finished edge comprises a contacted portion 120 and an uncontacted portion 122. For example, contacted portion 120 of the finished edge is a portion of the finished edge formed by removing material from glass laminate 100 during the contacting and translating. Additionally, or alternatively, uncontacted portion 122 of the finished edge is a remaining portion of the finished edge from which substantially no material was removed during the contacting and translating. In other embodiments, the entire cut edge comprises the contacted portion such that the uncontacted portion is omitted. In some embodiments, contacted portion 120 of the finished edge extends through substantially an entire thickness of glass sheet 102 as shown in FIG. 17. Thus, the entire cut edge of the glass sheet is contacted by abrasive surface 282 during the contacting and translating. Additionally, or alternatively, contacted portion 120 of the finished edge extends through all or a portion of adhesive 106 and/or non-glass substrate 104. For example, in the embodiments shown in FIG. 17, contacted portion 120 of the finished edge extends through the entire thickness of adhesive 106 and a portion of the thickness of non-glass substrate 104. In some embodiments, the finished edge of glass laminate 100 is beveled. For example, an angle γ is formed between contacted portion 120 and a plane parallel to uncontacted portion 122 as shown in FIG. 17. Angle γ can be determined by the orientation of abrasive surface 282 relative to glass laminate 100 during the contacting and translating. For example, angle γ corresponds generally to angle α.

In some embodiments, the contacting and translating removes material of glass laminate to a finishing depth $d_F$. For example, finishing depth $d_F$ is a distance between an innermost portion of the finished edge and an outermost portion of the finished edge as shown in FIG. 17. In some embodiments, the orientation of finishing tool 280 relative to surface 210 and/or glass laminate 100 can be adjusted to adjust finishing depth $d_F$. For example, carrier 250 can be adjusted to move finishing tool 280 toward or away from edge 214 of support 210 (e.g., to adjust distance $d_H$ as described herein) to adjust finishing depth $d_F$. Additionally, or alternatively, carrier 250 can be adjusted to move finishing tool 280 toward or away from rail 230 (e.g., to adjust distance $d_V$ as described herein) to adjust finishing depth $d_F$. In some embodiments, finishing depth $d_F$ is at least about 0.1 mm, at least about 0.2 mm, at least about 0.3 mm, at least about 0.4 mm, at least about 0.5 mm, at least about 1 mm, at least about 1.5 mm, or at least about 2 mm. Additionally, or alternatively, finishing depth $d_F$ is at most about 5 mm, at most about 4.5 mm, at most about 4 mm, at most about 3.5 mm, at most about 3 mm, at most about 2.5 mm, at most about 2 mm, at most about 1.5 mm, or at most about 1 mm.

The contacting and translating can be repeated on additional edges of glass laminate 100. For example, each edge of glass laminate 100 can be finished as described herein. In some embodiments, after finishing as described herein, glass laminate 100 can have an improved edge strength compared to glass laminates finished using conventional finishing processes. For example, an edge strength of glass laminate 100 comprising the finished edge is at least about 100 MPa. Without wishing to be bound by any theory, it is believed that such improved edge strength is a result of the finished edge being free or substantially free of the cracks or other defects present in the cut edge.

Surprisingly, the edge finishing apparatus and processes described herein can enable improved edge strength compared to conventional edge finishing processes, even when the same finishing tool is used. For example, using the finishing tool in combination with the edge finishing apparatus and processes described herein can enable improved edge strength compared to edge finishing processes using the same finishing tool (e.g., hand finishing with the finishing tool). For example, a glass laminate with edges finished using the apparatus and processes described herein can have an edge strength (e.g., a B10 edge strength) of at least about 100 MPa, determined using the modified procedure based on the procedure described in ASTM C-158 as described herein. Additionally, or alternatively, a glass laminate with edges finished using the apparatus and processes described herein can demonstrate an increase in edge strength (e.g., a B10 edge strength) of at least about 100%, at least about 120%, at least about 140%, at least about 160%, at least about 180%, at least about 200%, at least about 210%, at least about 215%, or at least about 218% compared to an unfinished glass laminate having the same configuration, determined using the modified procedure based on the procedure described in ASTM C-158 as described herein. Without wishing to be bound by any theory, it is believed that the precise control of the orientation of the abrasive surface of the finishing tool, the precise alignment of the rail with the edge of the glass laminate, and the secure engagement of the glass laminate with the surface of the support during the finishing enable the observed improved edge strength.

EXAMPLES

Various embodiments will be further clarified by the following examples.

Comparative Example 1

A preform glass laminate having the general configuration shown in FIGS. 1-2 was formed. The glass sheet was a flexible aluminosilicate glass sheet with a thickness of 0.2 mm commercially available as Corning® Willow® Glass from Corning Incorporated (Corning, N.Y., USA). The non-glass substrate was an 8 mm thick HPL panel with a 40 μm thick aluminum layer embedded beneath a decorative surface layer disposed at each outer surface of the non-glass substrate and commercially available as Material Exterior Grade (MEG) panels from ABET, Inc. (Englewood, N.J., USA). The adhesive was an optically clear adhesive commercially available as 3M™ Optically Clear Adhesive 8125 from 3M Company (Maplewood, Minn., USA).

A rectangular segment was cut from a central region of the preform glass laminate using a router bit mounted on a computer numerical control (CNC) machine to form an unfinished glass laminate having four cut edges.

Comparative Example 2

An unfinished glass laminate was formed as described in Comparative Example 1. Each of the four cut edges of the unfinished glass laminate was finished by sanding the edge using a handheld rotary sander commercially available as ETS EC 150/5 EQ from Festool USA (Lebanon, Ind., USA) with 320 grit sandpaper to form a finished glass laminate.

Example 1

An unfinished glass laminate was formed as described in Comparative Example 1. Each of the four cut edges of the unfinished glass laminate was finished using the apparatus shown in FIGS. 3-5 and 8-11 to form a finished glass laminate. The finishing tool was a rotary sander commercially available as ETS EC 150/5 EQ from Festool USA (Lebanon, Ind., USA) with 320 grit sandpaper. Angle θ was 65°. Finishing depth $d_F$ was about 0.5 mm.

Figure 18:
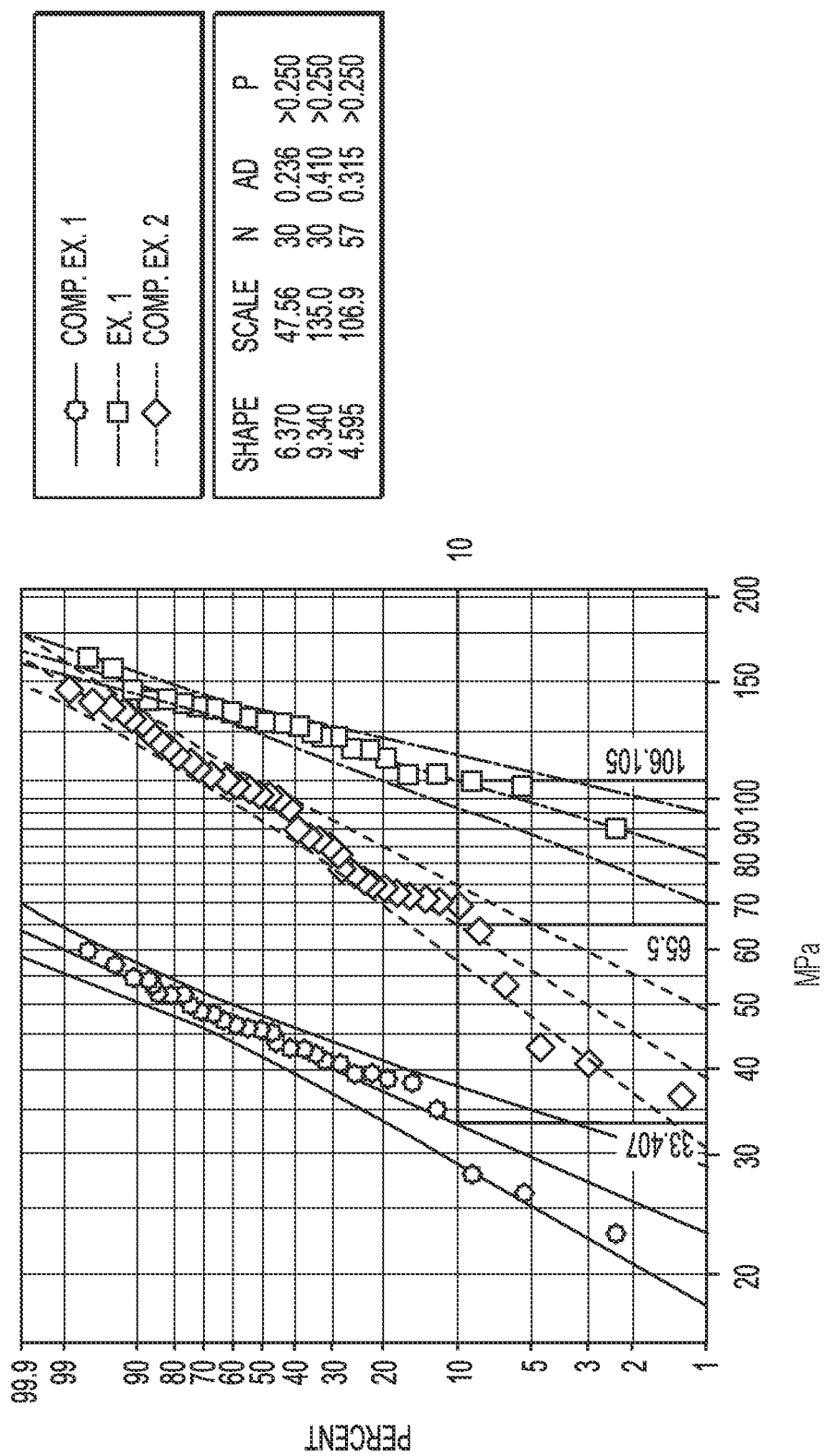
FIG. 18 is a Weibull plot comparing the edge strength of unfinished glass laminates produced as described in Comparative Example 1 and finished glass laminates produced as described in Comparative Example 2 and Example 1.

FIG. 18 is a Weibull plot comparing the edge strength of the unfinished glass laminate produced as described in Comparative Example 1 and the finished glass laminates produced as described in Comparative Example 2 and Example 1. The edge strengths were determined using the modified procedure based on the procedure described in ASTM C-158 as described herein. A sample of 30 unfinished glass laminates produced as described in Comparative Example 1 were evaluated. A sample of 57 finished glass laminates produced as described in Comparative Example 2 were evaluated. A sample of 30 finished glass laminates produced as described in Example 1 were evaluated. As shown in FIG. 18, the finished glass laminates of Example 1 had a B10 edge strength of 106 MPa, which is significantly higher than the B10 edge strength of the finished glass laminates of Comparative Example 2, which was 66 MPa. The B10 edge strength of the finished glass laminates of Example 1 showed a 218% improvement compared to the B10 edge strength of the unfinished glass laminates of Comparative Example 1, which was 33 MPa. In comparison, the B10 edge strength of the finished glass laminates of Comparative Example 2 showed only a 96% improvement compared to the B10 edge strength of the unfinished glass laminates of Comparative Example 1. Thus, the data shown in FIG. 18 illustrates that finishing the edges of a glass laminate using the apparatus and methods described herein enable improved edge strength compared to hand finishing methods, even using the same finishing tool.

It will be apparent to those skilled in the art that various modifications and variations can be made without departing from the spirit or scope of the claimed subject matter. Accordingly, the claimed subject matter is not to be restricted except in light of the attached claims and their equivalents.

The invention claimed is:

1. An apparatus for finishing a cut edge of a glass laminate, the apparatus comprising:
   a support for the glass laminate comprising a surface and an edge, wherein the glass laminate comprises a glass sheet and a non-glass substrate;
   a rail disposed adjacent to the support and extending substantially parallel to the edge of the support;
   a carrier coupled to the rail; and
   a finishing tool coupled to the carrier and comprising an abrasive surface positioned adjacent to the edge of the support, wherein the finishing tool comprises a first axis perpendicular to the abrasive surface, a second axis perpendicular to the first axis, and a third axis perpendicular to each of the first axis and the second axis;
   wherein the carrier is translatable along the rail to translate the abrasive surface of the finishing tool relative to the edge of the support,
   and wherein the carrier is adjustable to orient the abrasive surface of the finishing tool relative to the support such that an angle is formed between the abrasive surface and the edge of the support, measured along a plane parallel to the surface of the support;
   wherein the rail is rotatable about a longitudinal axis of the rail to adjust an angle between the abrasive surface of the finishing tool and the surface of the support, wherein the angle is measured along a plane perpendicular to the surface of the support and including the first axis.

2. The apparatus of claim 1, wherein the first axis of the finishing tool is a rotational axis of the abrasive surface of the finishing tool.

3. The apparatus of claim 2, wherein the abrasive surface of the finishing tool is non planar.

4. The apparatus of claim 1, wherein the carrier is adjustable to rotate the finishing tool about the second axis to adjust the angle between the abrasive surface of the finishing tool and the surface of the support, wherein the angle is measured along the plane perpendicular to the surface of the support and including the first axis.

5. The apparatus of claim 1, wherein the carrier is adjustable to rotate the finishing tool about the third axis to adjust the angle between the abrasive surface of the finishing tool and the edge of the support, wherein the angle is measured along the plane parallel to the surface of the support.

6. The apparatus of claim 1, wherein:
   the carrier comprises a body, a first arm coupled to the body, and a second arm coupled to the first arm; and
   the finishing tool is coupled to the second arm of the carrier.

7. The apparatus of claim 6, wherein the second arm of the carrier is rotatable about an axis of the second arm to adjust the angle between the abrasive surface of the finishing tool and the surface of the support.

8. The apparatus of claim 6, wherein the first arm of the carrier swings in an arc about the body to adjust the angle between the abrasive surface of the finishing tool and the edge of the support.

9. The apparatus of claim 1, comprising a vacuum system to draw a vacuum at the surface of the support to secure the glass laminate to the surface of the support.

10. The apparatus of claim 1, wherein the finishing tool comprises a rotary tool comprising a rotational axis, and the abrasive surface comprises an apex and is tapered in a direction outward from the apex toward a periphery of the abrasive surface.

* * * * *